US012309551B2

(12) United States Patent
Pedersen et al.

(10) Patent No.: US 12,309,551 B2
(45) Date of Patent: *May 20, 2025

(54) HEARING DEVICE OR SYSTEM COMPRISING A COMMUNICATION INTERFACE

(71) Applicant: Oticon A/S, Smørum (DK)

(72) Inventors: Michael Syskind Pedersen, Smørum (DK); Jesper Jensen, Smørum (DK)

(73) Assignee: OTICON A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,762

(22) Filed: Mar. 19, 2024

(65) Prior Publication Data

US 2024/0223971 A1 Jul. 4, 2024

Related U.S. Application Data

(63) Continuation of application No. 17/720,744, filed on Apr. 14, 2022, now Pat. No. 11,968,500.

(30) Foreign Application Priority Data

Apr. 15, 2021 (EP) .................................... 21168632

(51) Int. Cl.
*H04R 25/00* (2006.01)
*H03G 5/00* (2006.01)

(52) U.S. Cl.
CPC ........... *H04R 25/505* (2013.01); *H04R 25/40* (2013.01); *H04R 25/43* (2013.01); *H04R 25/554* (2013.01); *H04R 25/604* (2013.01)

(58) Field of Classification Search
CPC ...... H04R 25/505; H04R 25/40; H04R 25/43; H04R 25/554

(Continued)

(56) References Cited

U.S. PATENT DOCUMENTS

| | | | |
|---|---|---|---|
| 10,431,238 | B1 | 10/2019 | Biruski et al. |
| 11,515,953 | B1 | 11/2022 | Gutman et al. |

(Continued)

FOREIGN PATENT DOCUMENTS

| | | | |
|---|---|---|---|
| EP | 3 065 422 | A1 | 9/2016 |
| EP | 3 681 175 | A1 | 7/2020 |
| WO | WO2018/177839 | A1 | 10/2018 |

OTHER PUBLICATIONS

European Search Report issued in priority application No. 21168632.4 dated Oct. 12, 2021.

*Primary Examiner* — William J Deane, Jr.
(74) *Attorney, Agent, or Firm* — Birch, Stewart, Kolasch & Birch, LLP

(57) ABSTRACT

A hearing device, e.g. a hearing aid, comprises a) at least one input transducer for converting sound in the environment of the hearing device to respective at least one acoustically received electric input signal or signals representing said sound; b) a wireless receiver for receiving an audio signal from a wireless transmitter of a sound capturing device for picking up sound in said environment and providing a wirelessly received electric input signal representing said sound; and c) a processor configured c1) to receive said at least one acoustically received electric input signal or signals, or a processed version thereof; c2) to receive said wirelessly received electric input signal; and c3) to provide a processed signal. The processor comprises a signal predictor for estimating future values of said wirelessly received electric input signal in dependence of a multitude of past values of said signal, thereby providing a predicted signal. The hearing device further comprises d) an output transducer for presenting output stimuli perceivable as sound to the user in dependence of said processed signal from said processor, or a further processed version thereof. The processor is configured to provide said processed signal (Continued)

in dependence of the predicted signal or a processed version thereof 1) alone, or 2) mixed with said at least one acoustically received electric input signal or signals, or a processed version thereof. A hearing device comprising an earpiece and a separate audio processing device is further disclosed. The invention may e.g. be used in hearing devices in wireless communication with audio capture devices in an immediate environment of the user wearing the hearing device.

20 Claims, 8 Drawing Sheets

(58) Field of Classification Search
USPC ................................ 381/313, 320, 321, 318
See application file for complete search history.

(56) References Cited

U.S. PATENT DOCUMENTS

| | | | | |
|---|---|---|---|---|
| 2003/0116197 | A1 | 6/2003 | Taylor | |
| 2007/0173962 | A1 | 7/2007 | Rasmussen | |
| 2008/0253596 | A1* | 10/2008 | Klinkby | H04R 25/407 381/313 |
| 2010/0189292 | A1 | 7/2010 | Wurzbacher et al. | |
| 2011/0013794 | A1* | 1/2011 | Hau | H04R 25/356 381/321 |
| 2011/0137649 | A1 | 6/2011 | Rasmussen et al. | |
| 2017/0230765 | A1* | 8/2017 | Jensen | H04R 25/505 |
| 2017/0311094 | A1* | 10/2017 | Andersen | H04R 25/505 |
| 2019/0378531 | A1 | 12/2019 | Jensen et al. | |
| 2022/0408200 | A1 | 12/2022 | Johnson | |
| 2023/0125941 | A1 | 4/2023 | Kleijn et al. | |

* cited by examiner

HEARING DEVICE OR SYSTEM COMPRISING A COMMUNICATION INTERFACE

This application is a Continuation of copending application Ser. No. 17/720,744, filed on Apr. 14, 2022, which claims priority under 35 U.S.C. § 119(a) to Application No. 21168632.4, filed in Europe on Apr. 15, 2021, all of which are hereby expressly incorporated by reference into the present application.

TECHNICAL FIELD

The present disclosure relates to hearing systems or devices, e.g. hearing aids or headsets or similar portable audio processing devices.

SUMMARY

A hearing system, e.g. a hearing aid (HA) system (e.g. comprising one or two hearing aids), may be connected to one or more external wireless microphones, e.g., table microphones, etc. (e.g. to facilitate a hearing aid user's perception of speech from talkers in the environment of the user). When wireless microphones pick up a sound signal of interest, the sound signal is buffered, encoded, and potentially packetized, before it is transmitted electro-magnetically to the HA(s). This process delays the sound signal of interest. The exact delay is a function of the audio coding algorithm and transmission scheme used in the wireless system (could for example be a Bluetooth or UWB protocol). However, the introduced delay may be significant, i.e., several times 10 ms. If such delayed sound signal is presented to the hearing aid user, it may cause problems with audio-visual synchronicity, e.g., lip-reading, and/or comb-filter effects due to the direct sound reaching the ear drums of the user much earlier. In other words, such delay renders the received sound signal essentially useless for real-time processing/presentation to a user wearing the HA(s).

In an aspect, the present disclosure relates e.g. to a scenario where an external sound capturing device, e.g. a wireless microphone, transmits audio to a hearing device, e.g. a hearing aid, and where the signal is predicted in the hearing device based on the wirelessly received signal. The signal presented to the user via a loudspeaker of the hearing device may then be the predicted signal, or a mixture of a) the predicted signal with b) the acoustically received signal (picked up by a microphone of the hearing device). The mixture may be on a frequency range level (e.g. a frequency band level) and may vary over time (e.g. depending on signal quality estimates).

Rather than estimating an enhanced signal, we may as well estimate a gain (across time and frequency) which, when multiplied to the signal enhance the desired parts of the signal and reduces the noise. We may as well predict future values of such a gain signal. The signal predictor may be configured to estimate future values of a noise reduction gain signal in dependence of a multitude of past values of the input signal and/or past values of the gain signal.

In an embodiment, the signal presented to the user via a loudspeaker of the hearing device may be a mixture of a) the predicted signal, b) the acoustically received signal (picked up by a microphone of the hearing device), and c) the (non-predicted) wirelessly received signal from the sound capturing device. Signal components from the predicted signal (a) are ideally 'on time' and 'clean'; signal components from the acoustically received signal (b) are 'on time' but noisy; and signal components from the wirelessly received (non-predicted) signal (c) are 'not on time' (old) and 'clean'. A tradeoff may be useful in certain situations (time segments) and/or frequency ranges to present old signal components instead of noisy (or predicted) signal components. This may be dependent on a signal quality measure (e.g. signal to noise ratio (SNR) or a speech intelligibility (SI) index).

In another aspect, a hearing device or system, e.g. a hearing aid, comprising at least one earpiece configured to be worn at or in an ear of a user; and a separate audio processing device (in communication with the earpiece) is furthermore provided by the present disclosure. The earpiece or the audio processing device may comprise a signal predictor for estimating future values of an acoustically received signal (originally received in the earpiece), or a processed version thereof, in dependence of a multitude of past values of said signal, thereby providing a predicted signal. The aim of the predictor is to compensate for or reduce the delay incurred by the processing being conducted in the external processing device. The signal predictor may be configured to fully or partially compensate for a processing delay incurred by one or more, such as all of a) the transmission of the acoustically received electric input signal from the hearing device to the audio processing device, b) the processing in the audio processing device, and c) the transmission of the predicted signal or a processed version thereof to said earpiece and its reception therein.

In the present disclosure, a solution is presented that may make (parts of) the received sound signal useful for real-time processing at the HAs after all—in fact, the proposed solution is general and may find application in the very large area of wireless audio applications. Our basic solution is based on the idea of predicting future parts of the sound signal, given the present signal. The use of predictive algorithms to solve the problem of cancelling acoustically propagated sound reaching the eardrum in a hearing device has e.g. been dealt with in EP3681175A1.

A Hearing Device:

In an aspect of the present application, a hearing device, e.g. a hearing aid, is provided. The hearing device comprises

- at least one input transducer for converting sound in the environment of the hearing device to respective at least one acoustically received electric input signal or signals representing said sound;
- a wireless receiver for receiving an audio signal from a wireless transmitter of a sound capturing device for picking up sound in said environment and providing a wirelessly received electric input signal representing said sound;
- a processor configured
  - to receive said at least one acoustically received electric input signal or signals, or a processed version thereof;
  - to receive said wirelessly received electric input signal; and
  - to provide a processed signal.

The processor may comprise a signal predictor for estimating future values of said wirelessly received electric input signal (or for estimating future values of a gain to be applied to said signal) in dependence of a multitude of past values of said signal, thereby providing a predicted signal.

The hearing device further comprises an output transducer for presenting output stimuli perceivable as sound to the user in dependence of said processed signal from said processor, or a further processed version thereof.

The processor may be configured to provide said processed signal in dependence of the predicted signal or a processed version thereof alone, or mixed with said at least one acoustically received electric input signal or signals, or a processed version thereof.

The signal presented to the user via output transducer (e.g. a loudspeaker) of the hearing device (the processed signal) may be a mixture of a) the predicted signal, b) the at least one acoustically received electric input signal (picked up by the at least one input transducer (e.g. a microphone) of the hearing device), and c) the (non-predicted) wirelessly received electric input signal (received from the sound capturing device). A tradeoff may be made in certain situations (time segments) and/or frequency ranges to present old (non-predicted, but clean) signal components instead of noisy (or predicted) (but on-time) signal components. The mixture may be made dependent on a signal quality measure (e.g. signal to noise ratio (SNR) or a speech intelligibility (SI) index, and/or a speech presence probability (SPP) index), e.g. on a frequency band level.

Thereby hearing device with improved utilization of streamed sound from the environment may be provided.

The term 'or a processed version thereof' is in the present context taken to mean an original audio signal that has been subject to a processing algorithm that applies gain or attenuation to the original audio signal, and this results in a modified audio signal (preferably enhanced in some sense, e.g. noise reduced relative to a target signal). It is however also intended to cover 'extracted features or parameters' from an original audio signal (e.g. gains or quality parameters, etc.).

The hearing device may be configured to be worn by a user. The hearing device (or a part thereof) may be configured to be located at or in an ear of the user. The hearing device may comprise several separate parts, e.g. one part adapted to be located at or in an ear, and another part adapted to be located elsewhere on the user's body, the two parts being configured to be in communication with each other via a wired or wireless communication link.

The sound capturing device may e.g. be a 'wireless microphone' or a device with audio transmission capabilities comprising a microphone. The capturing device may e.g. be a contra-lateral hearing device (e.g. hearing aid) of a binaural hearing system (e.g. a binaural hearing aid system).

The term "mixed" is in the present context intended to mean that parts of the acoustic signal is completely replaced by the predicted signal, or that the two are combined, e.g., linearly or non-linearly, e.g. as a weighted mixture in the time domain, e.g. varying over time. Further, the mixing may take place in the frequency domain such that some (e.g. all) frequency bands of the acoustic signal are mixed with some (e.g. all) frequency bands of the predicted signal. The (number of) frequency bands used in the mixing can vary across time, e.g., as a function of a quality estimate of the predicted signal (e.g. weighted according to an estimated quality measure, so that time-frequency units having a relatively high quality measure (e.g. SNR) are weighted higher than time-frequency units having a relatively low quality measure).

The processor may comprise a delay estimator configured to estimate a time-difference-of-arrival of sound from a given sound source in said environment at said processor between the acoustically received electric input signal or signals, or a processed version thereof, and the wirelessly received electric input signal.

The time-difference-of-arrival (T) may be fed to the signal predictor to define a prediction time period of the signal predictor. The transmit a time-difference-of-arrival (T) may, e.g., be determined by correlating the acoustically received signal with the wirelessly received signal. Alternatively or in addition, the delay estimator may be based on ultra wide band technology.

The signal predictor may alternatively be located in the sound capturing device. In that case, the hearing device should be configured to transmit a time-difference-of-arrival (TDOA, cf. e.g. signal T in FIG. 4) to the sound capturing device, specifically the TDOA between a) the acoustically received electric input signal or signals, or a processed version thereof, and b) the wirelessly received electric input signal.

The hearing device may comprise a wireless transmitter for transmitting data to another device. The wireless transmitter may be configured to transmit an audio signal (e.g. an acoustically received electric input signal or signals, or a processed version thereof (e.g. a low-pass filtered version, and/or e.g. a transformed signal, in which case the "signal" may be transmitted in terms of transform coefficients), or an information or control signal, e.g. the time-difference-of-arrival (T) of sound from a given sound source in the environment at the processor. The processor or a part thereof may be located in another device than the part (earpiece) located at the ear. The hearing device may e.g. comprise an earpiece adapted for being located at the ear and a processing device adapted for being worn or carried by the user (or otherwise accessible for the earpiece regarding communication), cf. e.g. FIG. 6A, 6B, 6C.

The processor may comprise a selection controller configured to include the estimated predicted signal or parts thereof in the processed signal in dependence of a sound quality measure. The predicted signal may be included in the signal to be presented to the user in time regions where the predicted signal fulfils a sound quality criterion (e.g. in that the sound quality measure is larger than a threshold value). For example, if the signal to noise ratio (SNR) is sufficiently high, one could simply substitute the (noisy) acoustically received electric input signal picked up at a microphone of the hearing device with the predicted signal, for example in signal regions, e.g. in time-regions or time-frequency regions where the SNR in the predicted signal is higher than the SNR in the acoustically received electric input signal (as estimated by SNR estimation algorithms on board the hearing device). The acoustically received electric input signal, the wirelessly received electric input signal and the predicted signal may be time domain signals (represented by respective streams of digital audio samples).

The hearing device may comprise a transform unit, or respective transform units, for providing the at least one acoustically received electric input signal or signals, or a processed version thereof, and/or the wirelessly received electric input signal, in a transform domain. The transform domain may e.g. be the frequency domain, e.g. the Short-Time Fourier Transform (STFT) domain. Other transform domains may be Laplace domain, cosine transform domain, wavelet transform domain, etc. The wirelessly received electric input signal may already be in a transform domain as provided by the wireless receiver.

Other non-linear mappings, which—strictly speaking—are not transforms, may be envisioned. For example, the signals may be mapped non-linearly to some "inner domain" by a neural network—the prediction/signal replacement may take place in this inner domain—subsequently, the resulting time domain signal may be reconstructed by applying an approximately inverse map from the inner domain to the time domain. The neural network performing these non-linear mappings may be an auto-encoder network.

The transform unit(s) may be configured to provide the signals in the frequency domain. A transform unit may e.g. be or comprise an analysis filter bank, or a Fourier transform algorithm, e.g. a Discrete Fourier Transform (DFT) algorithm, or a Short Time Fourier Transform (STFT) algorithm, or similar. Thereby signal processing can be performed in frequency sub-bands or in a time-frequency representation (m, q), where m and q are time and frequency indices, respectively. The frequency sub-bands or the time-frequency representation (m, q) may e.g. cover at least a part of the normal human auditory frequency range (from 20 Hz to 20 kHz).

The signal predictor may be configured to estimate future values of the wirelessly received electric input signal in the transform domain, e.g. in the frequency domain (or time-frequency domain) based on past values of the signal.

The processor may be configured to include the estimated future values of the wirelessly received electric input signal in the processed signal only in a limited part of an operating frequency range of the hearing device. The operating frequency range of the hearing device is a part of the normal human auditory frequency range (20 Hz to 20 kHz), e.g. up to 12 kHz or up to 10 kHz, or up to 8 kHz. The limited part of the frequency range may e.g. be or comprise a low-frequency part, e.g. frequencies less than 4 kHz, such as less than 2 kHz, such as less than 1 kHz.

The limited part of an operating frequency range of the hearing device may be pre-determined, e.g. in advance of the use of the hearing device, e.g. adapted to a user's hearing profile (e.g. audiogram). The limited part of an operating frequency range of the hearing device may be adaptively determined (over time), e.g. in dependence of a sound quality parameter or criterion of the predicted signal (possibly in comparison with a sound quality parameter of the at least one acoustically received electric input signal or signals). The sound quality criterion may be based on an SNR-estimate or similar parameter estimating sound quality.

The processor, e.g. the selection controller, may be configured to provide that some time frequency units, e.g. STFT units, are replaced and some are not. But the replaced STFT units need not all be connected (immediately neighboring each other).

The processed signal may comprise future values of the wirelessly received electric input signal only in frequency bands or time-frequency regions that fulfil a sound quality criterion. For example, one could decompose and substitute the predicted signal (z(n)) in frequency channels (e.g. low frequency channels), for which it is known that the predicted signal is generally of better quality than the (noisy) hearing aid microphone signal. Substitution of acoustically received signal parts with predicted parts may be performed in the time-frequency domain according to an estimate of the SNR in time-frequency tiles:

$$\hat{\xi}(m, q) = \sum_{m'=m-T'-K'+1}^{m-T'} |s(m', q)|^2 \Big/ \sum_{m'=m-T'-K'+1}^{m-T'} |e(m', q)|^2,$$

where s(m, q) and e(m, q) denote time-frequency representations (for example, short-time Fourier transforms) of signals s(n) and e(n), where s(n) is the wirelessly received electric input signal and where e(n) is the estimation error in the prediction (when the predicted signal z(n) is written as z(n)=s(n)+e(n)), T' is the delay (in time units m') of wirelessly received signal compared to the acoustically received signal, K'−1 is the number of past time units (m') on which the prediction is based, m (m') and q are time and frequency indices, respectively.

On a more general note, the processor (e.g. the selection controller) may be configured to combine (for example linearly combine, cf. weight α) the acoustically received (Y, $Y_{BF}$) and the predicted (Z) signals to a resulting signal ($\hat{S}$) (cf. e.g. FIG. 3, 4):

$$\hat{S}(m, q) = \alpha^* Z(m, q) + (1-\alpha)^* Y(m, q),$$

where 0≤α≤1, and where α may be a function of the predicted-signal-quality-estimator, and where Z(m,q) is a TF-unit of the predicted signal and Y(m,q) (or $Y_{BF}$(m,q), cf. FIG. 3) is a TF-unit of the acoustically received signal. The predicted-signal-quality-estimator (e.g. SNR) may be time and frequency dependent. In that case, or independent thereof, the weighting parameter α may be time and frequency dependent.

The hearing device may comprise a beamformer configured to provide a beamformed signal based on said at least one acoustically received electric input signal or signals and said predicted signal. The predicted signal z(n) (or Z(m,q)) may be combined with one or more of the microphone signals of the hearing device in various beamforming schemes in order to produce a final noise-reduced signal. In this situation, the signal z(n) is simply considered as yet another microphone signal with a noisy realization of the target signal.

The hearing device may be configured to apply spatial cues to the predicted signal before being presented to the user. The spatial cues may be based on the location of the external device (the wireless transmitter) or based on the location of the talker. The hearing device may comprise or have access to a database of acoustic transfer functions from a number of locations/directions around the user. When the location of the wireless transmitter or the talker is known, an appropriate acoustic transfer function or functions can be selected and applied to the predicted signal. Hereby it becomes easier for the hearing aid user to localize the received sound.

The hearing device may be configured to only activate the signal predictor in case the time-difference-of-arrival is larger than a minimum value. In case T=TDOA is small (e.g. negative), prediction should not be applied, e.g. when T>0 or T>5 ms or T>10 ms (where $T=T_1-T_2$, where $T_1$ and $T_2$ are the time of arrival at the hearing device of the wirelessly received signal and ('corresponding') the acoustically received signal). Even though prediction is not applied, appropriate substitution of signals or parts thereof may still be applied.

A Hearing Device Comprising an Earpiece and an External Audio Processing Device:

A hearing device or system, e.g. a hearing aid, is furthermore provided by the present disclosure. The hearing device or system comprises

- at least one earpiece configured to be worn at or in an ear of a user; and
- a separate audio processing device.

The at least one earpiece comprises

- an input transducer for converting sound in the environment of the hearing device to an acoustically received electric input signal representing said sound;

a wireless transmitter for transmitting said acoustically received electric input signal, or a part thereof, to said audio processing device;

a wireless receiver for receiving a first processed signal from said audio processing device, at least in a normal mode of operation of the hearing device; and an output transducer for converting a final processed signal to stimuli perceived by said user as sound.

The audio processing device comprises a wireless receiver for receiving said acoustically received electric input signal, or a part thereof, from the earpiece, and to provide a received signal representative thereof;

a computing device for processing said received signal, or a signal originating therefrom, and to provide a first processed signal;

a transmitter for transmitting said first processed signal to said earpiece.

The earpiece or the audio processing device may comprise a signal predictor for estimating future values of said received signal (or for estimating future values of a gain to be applied to said signal), or a processed version thereof, in dependence of a multitude of past values of said signal, thereby providing a predicted signal.

The signal predictor may be configured to fully or partially compensate for a processing delay incurred by one or more, such as all of the transmission of the acoustically received electric input signal from the hearing device to the audio processing device, the processing in the audio processing device, and the transmission of the predicted signal or a processed version thereof to said earpiece and its reception therein.

The final processed signal, at least in a normal mode of operation of the hearing device, may be constituted by or comprises at least a part of the predicted signal.

The signal predictor may comprise a prediction algorithm (either working in the time domain or in a transform domain, e.g. the time-frequency domain) configured to predict future values of an input signal based on past values of the input signal, and knowledge of the processing delay (T) between the first future value(s) and the latest past value(s) of the input signal. The processing delay (T) may comprise the delay incurred by the wireless link between the earpiece and the separate processing device. The processing delay (T) may (further) include the processing delay in the audio processing device. The processing delay ($T_{link}$) of the wireless link is dependent of the technology (communication protocol) used for establishing the link, be it Bluetooth, Bluetooth Low Energy, Ultra Wideband, Zigbee, or any other standardized or proprietary (short range) communication technology. The processing delay ($T_{link}$) of the wireless link may be measured or be known or estimated from the communication protocol. The processing delay ($T_{apd}$) of the audio processing device is dependent of the processing blocks of the audio path through the device from the receiver to the transmitter. The processing delay ($T_{apd}$) of the audio processing device is known may be measured or estimated basic data of the processing device (sampling frequency, processing algorithms, etc.). In case the earpiece comprises a forward path (e.g. comprising a signal processing unit (cf. HAPep in FIG. 6B, 6C) and in case a processed signal of the forward path is to be mixed with the predicted signal received from the audio processing device (cf. e.g. FIG. 6B, 6C), the processing delay (T) used as input to the signal predictor (PRED) in the audio processing device may be smaller by the delay of the signal processing unit of the earpiece.

The computing device may be constituted by or comprise a signal processor (e.g. an audio signal processor). The computing device may be configured to carry out computations of a neural network or similar learning algorithms.

The first processed signal(s) transmitted from the audio processing device to the earpiece (via the wireless link between them) do not necessarily have to be 'audio signal(s)' as such. It may as well be features derived from the audio signal(s). Instead of transmitting an audio signal back to the earpiece, parameters derived from the audio signal, e.g. gains derived from the predicted signal, may e.g. be transmitted to the earpiece.

The term 'or a processed version thereof' may e.g. cover such extracted features from an original audio signal. The term 'or a processed version thereof' may e.g. also cover an original audio signal that has been subject to a processing algorithm that applies gain or attenuation to the original audio signal and this results in a modified audio signal (preferably enhanced in some sense, e.g. noise reduced relative to a target signal).

The signal predictor may be located in the audio processing device (e.g. a telephone or a dedicated processing device, e.g. a remote control device) (which may be configured to have more processing capability than the earpiece). The signal predictor may, however, be located in the earpiece, e.g. using the first processed signal from the audio processing device as input to the signal predictor (since the total round trip delay T may be assumed known in both devices, e.g. stored in memory of both devices, or otherwise available to both devices).

The audio processing device may comprises said signal predictor. The first processed signal may comprise the predicted signal, or a processed version thereof.

The earpiece may comprise an earpiece-computing device configured process said acoustically received electric input signal and/or to said first processed signal received from the audio processing device, and to provide said final processed signal. The earpiece-computing device may e.g. comprise a digital signal processor, e.g. an audio processor, and/or be configured to execute computations of a neural network or other learning algorithms.

The hearing device may comprise a transform unit configured to convert said received signal to a received signal in a transform domain. The transform domain may e.g. be the frequency domain, e.g. the Short-Time Fourier Transform (STFT) domain. Other transform domains may be Laplace domain, cosine transform domain, wavelet transform domain, etc. The hearing device may e.g. comprise an inverse transform domain unit configured to convert a signal in a transform domain to a signal in the time domain. The hearing device may comprise an inverse transform domain unit, e.g. an inverse Fourier transform algorithm or a synthesis filter bank.

The hearing device may be configured to operate the signal predictor in the time-frequency domain. The hearing device may, however, be configured to operate the signal predictor in the time-domain, e.g. by placing an inverse transform domain block before (upstream) the signal predictor (if the audio signal is processed in a transform domain prior to the signal predictor).

The earpiece-computing device may, at least in a normal mode of operation of the hearing device, be configured to mix the acoustically received electric input signal, or the modified signal, with a predicted signal received from the audio processing device and to provide the mixture as the final processed signal to the output transducer.

The earpiece-computing device, in an earpiece-mode of operation, where said first processed signal is not received from the audio processing device, or is received in an inferior quality, is configured to provide the final processed signal to the output transducer in dependence of the acoustically received input signal. The 'earpiece mode of operation' is assumed to be a default mode of operation of the hearing device in case no or a poor link between the earpiece and the audio processing device can be established. Thereby a certain minimum processing of the acoustically received electric input signal (e.g. a basic hearing loss compensation, and/or noise reduction) can be provided even in the absence of the audio processing device (or of a breakdown of the wireless link).

The separate audio processing device may be configured to be worn or carried by the user. The separate audio processing device may alternatively be configured to lie on a table or other support (e.g. in a drawer). The separate audio processing device may e.g. be located in another room, as long as the wireless link between the earpiece and the separate audio processing device has sufficient transmission capability to allow an exchange of data (incl. audio data) between them to be carried out with sufficient quality.

A Further Hearing Device Comprising an Earpiece and an External Audio Processing Device:

In a further aspect, a hearing device or system is provided by the present disclosure. The hearing device or system comprises

- at least one earpiece configured to be worn at or in an ear of a user and to receive an acoustic signal and to present a final processed signal to the user; and
- a separate audio processing device in communication with the at least one earpiece; wherein the earpiece is configured to transmit said acoustic signal to the audio processing device; and wherein the audio processing device comprises a signal predictor for estimating future values of the acoustical signal received by the at least one earpiece, or a processed version thereof, in dependence of a multitude of past values of said signal, thereby providing a predicted signal; and wherein the predictor is configured to compensate for or reduce the delay incurred by the processing being conducted in the external processing device.

The audio processing device may be configured to transmit the predicted signal or a processed version thereof to said earpiece; and wherein the earpiece is configured to determine said final processed signal in dependence of said predicted signal.

The signal predictor may be configured to fully or partially compensate for a processing delay incurred by one or more, such as all of a) a transmission of the acoustically received electric input signal from the hearing device to the audio processing device, b) a processing in the audio processing device providing a predicted signal, and c) a transmission of the predicted signal or a processed version thereof to said earpiece and its reception therein.

Other Hearing Aid Features:

The following are intended to be combinable with the hearing device as well the hearing device comprising an earpiece and an external audio processing device as described above in the detained description of embodiments or in the claims.

The hearing device may be constituted by or comprise an air-conduction type hearing aid, a bone-conduction type hearing aid, a cochlear implant type hearing aid, or a combination thereof. The hearing device, e.g. a hearing aid, may comprise a hearing instrument, e.g. a hearing instrument adapted for being located at the ear or fully or partially in the ear canal of a user, e.g. a headset, an earphone, an ear protection device or a combination thereof.

The hearing device, e.g. a hearing aid, may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal.

The hearing device may comprise an output unit for providing a stimulus perceived by the user as an acoustic signal based on a processed electric signal. The output unit may comprise an output transducer. The output transducer may comprise a receiver (loudspeaker) for providing the stimulus as an acoustic signal to the user (e.g. in an acoustic (air conduction based) hearing aid or headset). The output transducer may comprise a vibrator for providing the stimulus as mechanical vibration of a skull bone to the user (e.g. in a bone-attached or bone-anchored hearing aid). The output transducer may comprise a number of electrodes of a cochlear implant (for a CI type hearing aid) or a vibrator of a bone conducting hearing aid.

The hearing device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing device may comprise a directional microphone system adapted to spatially filter sounds from the environment, and thereby enhance a target acoustic source among a multitude of acoustic sources in the local environment of the user wearing the hearing device. The directional system may be adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may comprise antenna and transceiver circuitry allowing a wireless link to an entertainment device (e.g. a TV-set), a communication device (e.g. a telephone), a wireless microphone, or another hearing device, e.g. a hearing aid, etc. The hearing device may thus be configured to wirelessly receive a direct electric input signal from another device. Likewise, the hearing device may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing device can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing device and the other device is below 70 GHZ, e.g. located in a range from 50 MHz to 70 GHZ, e.g. above 300 MHZ, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology) or Ultra WideBand (UWB) technology. From UWB, spatial or directional information about the position of the external device relative to the hearing device, can be provided. Such information, e.g. the time-delay of arrival may be used as information to the prediction.

The hearing device may be or form part of a portable (i.e. configured to be wearable) device, e.g. a device comprising a local energy source, e.g. a battery, e.g. a rechargeable battery. The device, e.g. a hearing aid or headset, may e.g. be a low weight, easily wearable, device, e.g. having a total weight less than 100 g, such as less than 20 g.

The hearing device may comprise a 'forward' (or 'signal') path for processing an audio signal between an input and an output of the hearing device. A signal processor may be located in the forward path. The signal processor may be adapted to provide a frequency dependent gain according to a user's particular needs (e.g. hearing impairment). The hearing device may comprise an 'analysis' path comprising functional components for analyzing signals and/or controlling processing of the forward path. Some or all signal processing of the analysis path and/or the forward path may be conducted in the frequency domain, in which case the hearing device comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 KHz (adapted to the particular needs of the application) to provide digital samples $x_n$ (or x[n]) at discrete points in time $t_n$ (or n), each audio sample representing the value of the acoustic signal at $t_n$ by a predefined number No of bits, No being e.g. in the range from 1 to 48 bits, e.g. 24 bits.

Each audio sample is hence quantized using No bits (resulting in $2^{Nb}$ different possible values of the audio sample). A digital sample x has a length in time of $1/f_s$, e.g. 50 μs, for $f_s$=20 KHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing devices may comprise a digital-to-analogue (DA) converter to convert a digital signal to an analogue output signal, e.g. for being presented to a user via an output transducer.

The hearing device, e.g. the input unit, and or the antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise an (analysis) filter bank for filtering a (time varying) input signal and providing a number of (time varying) output signals each comprising a distinct frequency range of the input signal. The TF conversion unit may comprise a Fourier transformation unit (e.g. comprising a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing device from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing device may be split into a number NI of frequency bands (e.g. of uniform width), where NI is e.g. larger than 5, such as larger than 10, such as larger than 50, such as larger than 100, such as larger than 500, at least some of which are processed individually. The hearing device may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device (e.g. a hearing aid), a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments or (time-frequency) components of the electric microphone signal comprising human utterances (e.g. speech) in the user's environment can be identified, and thus separated from time segments only (or mainly) comprising other sound sources (e.g. naturally or artificially generated noise). The voice activity detector may be adapted to detect as a VOICE also the user's own voice. Alternatively, the voice activity detector may be adapted to exclude a user's own voice from the detection of a VOICE.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);
b) the current acoustic situation (input level, feedback, etc.), and
c) the current mode or state of the user (movement, temperature, cognitive load, etc.);
d) the current mode or state of the hearing device (program selected, time elapsed since last user interaction, etc.) and/or of another device in communication with the hearing device.

The classification unit may be based on or comprise a neural network, e.g. a trained neural network.

The hearing device may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing device may further comprise other relevant functionality for the application in question, e.g. compression, noise reduction, etc.

The hearing device, e.g. a hearing aid, may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing device as described above, in the 'detailed description of embodiments' and in the claims, is moreover provided. Use may be provided in a system comprising one or more hearing devices (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Hearing System:

In a further aspect, a hearing system comprising a hearing device, e.g. a hearing aid, as described above, in the 'detailed description of embodiments', and in the claims, AND an auxiliary device is moreover provided.

The hearing system may be adapted to establish a communication link between the hearing device and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like. The auxiliary device may be or comprise a dedicated processing device (e.g. worn by the user during normal use of the hearing system). The dedicated processing device may be in communication with the hearing aid (e.g. an earpiece) and configured to perform at least some of the processing of the hearing aid system, e.g. 'power hungry' parts and/or processing intensive parts, e.g. parts related to learning algorithms such as neural networks.

The auxiliary device may be constituted by or comprise a remote control for controlling functionality and operation of the hearing device(s). The function of a remote control may be implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The auxiliary device may be constituted by or comprise another hearing device, e.g. a hearing aid. The hearing system may comprise two hearing devices adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing device, e.g. a hearing aid, or a hearing system described above in the 'detailed description of embodiments', and in the claims. The APP may be configured to run on cellular phone, e.g. a smartphone, or on another portable device allowing communication with said hearing device or said hearing system.

Embodiments of the disclosure may e.g. be useful in applications such as hearing devices in wireless communication with other devices in an immediate environment of the user wearing the hearing device.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
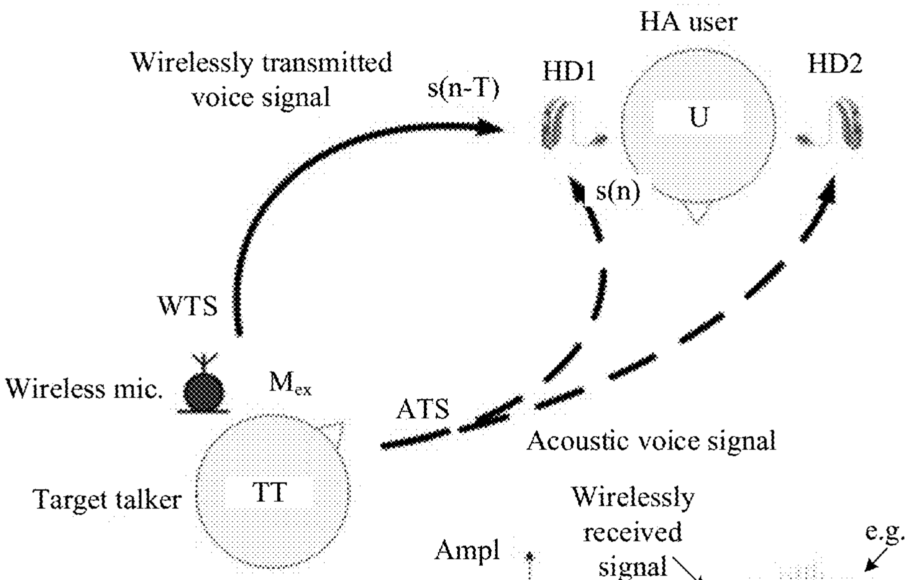
FIG. 1A illustrates a situation where a hearing aid system comprising left and right hearing aids receives a wireless speech signal s(n−T) and an acoustic signal s(n), where it is assumed that the wireless signal arrives at hearing aids later than the acoustic signal (T>0)

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing systems, e.g. hearing aids or headsets. It relates in particular to a situation where α wearer of the hearing system receives acoustic as well as electromagnetically transmitted versions of sound from a sound environment around the wearer of the hearing system. Mutual timing of the arrival of the two representations matter (in particular if they differ in propagation/processing time). A too large difference in time of arrival (e.g. more than 10-20 ms) of the same sound 'content' of the two representations at the user's ear leads to confusion and disturbance, rather than improved perception (e.g. speech intelligibility) by the wearer.

Consider a situation, where a user is in a very noisy environment—the target talker is speaking, but the SNR at the user is low, because he or she is located at a distance from the target talker and the user cannot understand the target talker. However, a wireless microphone is located on the table, very close to the target talker and can pick up an essentially noise-free version of the target speech signal. Unfortunately, the essentially noise-free signal picked up by the wireless microphone is delayed by TD (e.g. 30 ms) relative to the direct sound (for example) when it arrives at the user (and thus the hearing system worn by the user), and it cannot be presented to the user for the reasons described above.

However, the hearing system may use the received (essentially clean, but delayed) signal to predict the clean signal TD (e.g. 30 ms) into the future—the prediction will obviously not be perfect, but parts of the predicted signal (in particular low-frequency parts) will be a good representation of the actual clean signal TD (e.g. 30 ms) in the future. This predicted part can be usefully presented to the user, either directly, or combined with the microphone signals of the hearing system.

Further, a gain varying in time and frequency may be extracted from the predicted signal and applied to the hearing aid microphone signals. The gain may e.g. be depending on the level of the signal of interest, such that only the time-frequency regions of the external signal with high amount of energy are preserved (and the low-energy (or low SNR) regions are attenuated).

Figure 1B:
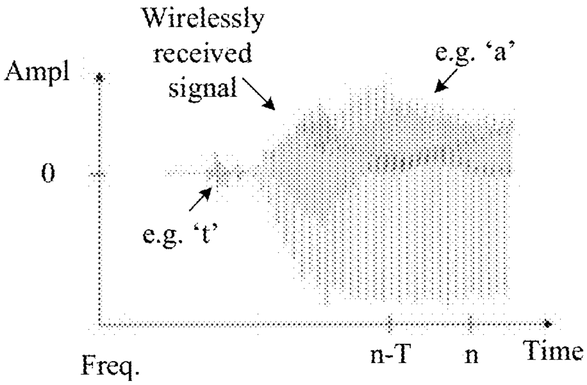
FIG. 1B shows an exemplary waveform of amplitude versus time for a wirelessly received signal representing speech, FIG. 1C schematically shows a time-frequency representation of the waveform of FIG. 1B, and FIG. 1D schematically shows a time-domain representation of the waveform of FIG. 1B, FIG. 2A schematically shows a time variant analogue signal (Amplitude vs time) and its digitization in samples, the samples being arranged in a number of time frames, each comprising a number $N_s$ of samples, and FIG. 2B schematically illustrates a time-frequency representation of the time variant electric signal of FIG. 2A, in relation to a prediction algorithm according to the present disclosure.

More specifically, consider the situation depicted in FIG. 1A, 1B, IC, where the speech signal of a target talker (TT) is picked up by a wireless microphone ($M_{ex}$). FIG. 1A shows a situation where a hearing aid system comprising left and right hearing aids (HD1, HD2) receives a wireless speech signal s(n-T) and an acoustic signal s(n), where it is assumed that the wireless signal arrives at the hearing aids a time period T (e.g. ms) later than the acoustic signal (i.e. T>0). FIG. 1B shows an exemplary waveform of amplitude versus time for the wirelessly received (relatively high quality) speech signal s.

It should be noted that this is not always the case. It takes approximately 3 ms for sound to travel 1 meter. If e.g. the sound source is 5 meters away, the transmission delay through air is ms, so in fact the wirelessly transmitted sound may arrive prior to the sound picked up by the microphones. It may thus be advantageous knowing the TDOA, and only apply prediction, when T>0 or T>5 ms or T>10 ms (where $T=T_1-T_2$, where $T_1$ and $T_2$ are the time of arrival at the hearing device of the wirelessly received signal and ('corresponding') the acoustically received signal, cf. below).

In the wireless microphone ($M_{ex}$), the speech signal is encoded and transmitted (WTS) to the hearing aid user (U), where it is received $T_1$ ms later (e.g. in one or both hearing aids (HD1, HD2) or a in separate processing device in communication with the hearing aid(s)). Meanwhile, the acoustic speech signal (ATS) emitted from the target talker (TT) is received at the microphones of the hearing aid user $T_2$ ms later. Hence, the wirelessly transmitted signal (WTS) is delayed by $T=T_1-T_2$ ms compared to the acoustic signal (ATS) received at the hearing aid user (U). There may be differences between the time of arrival of the acoustic signals (equal to the interaural time difference, ITD) (and theoretically also between the time of arrival of the wirelessly transmitted signal) at the two hearing aids (HD1, HD2).

In practice, the time-difference-of-arrival (TDOA) T may be estimated by a similarity measurement between the relevant signals, e.g. by correlating the acoustic signal and the wirelessly received signal of a given hearing aid to determine the time difference T. Alternatively or additionally, the time-difference-of-arrival T may be estimated by other means, e.g. via ultra wide band (UWB) technology.

In a binaural hearing aid setup comprising left and right hearing instruments (cf. e.g. HD1, HD2 in FIG. 1A), the TDOA can be preferably jointly estimated, e.g. as the smallest TDOA of each hearing instrument. Alternatively, the TDOA may be estimated separately for each instrument.

If T is too large, e.g. larger than 10 ms, the wirelessly received signal cannot be used for real-time presentation to the user. In that case, we propose to use signal samples that are available in the hearing aid system s(n−T−K+1), . . . , s(n−T) to predict future samples s(n) (relative to the signal available in the hearing aid system (HD1, HD2)), where K−1 is the number of past samples of the wirelessly received signal used for the prediction (s(n−T) is the last wirelessly received sample, so that K is the number of samples used for the prediction). The prediction may be performed in the time domain or in other domains, e.g. the (time-) frequency domain.

Figure 1C:
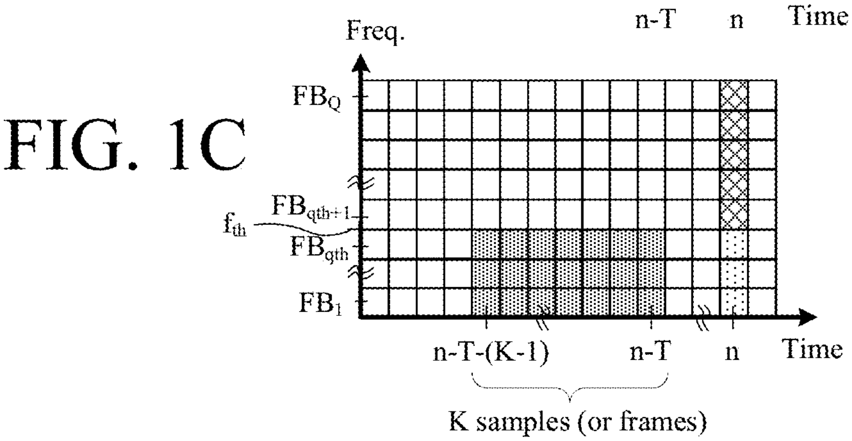

FIG. 1C schematically illustrates a time-frequency domain representation of the waveform illustrated in FIG. 1B. The time samples of FIG. 1B are transformed into the frequency domain as a number Q of (e.g. complex) values of the time domain-signal s(n), as e.g. provided by a Fourier transform algorithm (such as Short-Time Fourier Transform, STFT, or the like). In FIG. 1C the same time index n is used for time samples and time frames. This is done for illustrational simplicity. In practice, a number of samples, e.g. 64, are included in a time frame, which, on the other hand, may overlap. In each frequency band, or as illustrated in FIG. 1C, in the lower frequency bands, e.g. below a threshold frequency $f_{th}$, future 'samples' $s_q(n)$ are predicted based on (K−1) past samples (or frames) $s_q(n-T-K+1), \ldots, s_q(n-T)$, for the q'th frequency band $FB_q$ (i.e. for the frequency bands $FB_1, \ldots FB_{qth}$ below the threshold frequency, $f_{th}$). The predicted values are indicated in FIG. 1C by the light dotted shading of time frequency-bins at time index n). The values whereon the predicted values are based are indicated in FIG. 1C by the dark dotted shading of time frequency-bins at time indices n−T−(K−1), . . . , n−T. In case the prediction is limited to the low-frequency bands ($FB_1, \ldots FB_{qth}$) below the threshold frequency, the frequency bands ($FB_{qth+1}, \ldots, FB_Q$) above the threshold frequency ($f_{th}$) may be represented by one of the noisy microphone signals, or by a beamformed signal generated as a combination of the two or more microphone signals (as indicated by the cross hatched time frequency-bins at time index n).

Different use cases of the concept of the present disclosure may be envisioned, e.g. the following situations:

1) The wireless microphone is an external wireless microphone—e.g. a microphone unit clipped on to a target speaker, a table microphone, a microphone in a smartphone, etc. (cf. e.g. $M_{ex}$ in FIG. 1A).
2) The "wireless microphone" is in fact the opposite hearing device (HDx, x=1 or 2 as the case may be), and the target signal is an external sound source: the sound signal is picked up by the left (HD2 for example) and sent to the right hearing device (HD1 for example) using signal prediction to reduce latency, so that the (parts of) the microphone signal from the left (HD2) may replace/or be combined with the right (HD1) microphone signals (see below for a more detailed description).

3) The "wireless microphone" is not a microphone. We consider the situation, where we would like to export computations to an external (processing) device, e.g. a smart-phone: A sound signal is picked up by the hearing device-users microphones, sent from the hearing device to an external device for computations (potentially using signal prediction to reduce latency), and sent back from the external device to the hearing device (potentially using signal prediction to reduce latency).

Figure 1D:
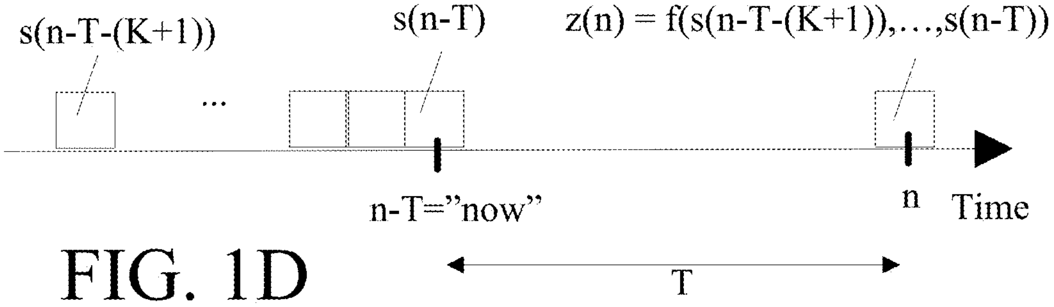

Prediction of future samples s(n) based on past samples s(n−T−K+1), . . . , s(n−T), as illustrated in FIG. 1C, 1D. FIG. 1C schematically shows a time-frequency representation of the waveform of FIG. 1B, and FIG. 1D schematically shows a time-domain representation of the waveform of FIG. 1B. As illustrated in FIG. 1D, the predicted signal z(n) is a function 'f' of a number K of past samples of wirelessly received signal s (from $t_{now}$=n−T and back): s(n−T−K+1), . . . , s(n−T). The time $t_{now}$=n−T is a time of arrival of the wireless signal at the hearing device and indicates a delay T relative to the time of arrival of the (corresponding) acoustically propagated signal y. Hence, at $t_{now}$=n−T, the hearing device can have access to samples of s at t=$t_{now}$ and any number of past sample values at $t_{now}$−1, $t_{now}$−2, etc. of s.

Prediction of future samples s(n) based on past samples s(n−T−K+1), . . . , s(n−T) is a well-known problem with well-known existing solutions. For example, prediction of future samples s(n) may be based on linear prediction, see e.g. [1], where an estimate z(n) of s(n) is formed as a linear combination of past samples, i.e., $$z(n)=\sum_{k=0}^{P-1} a_k s(n-T-k), \tag{1}$$

where $a_k$, k=0, . . . , P−1 are time-varying, signal-dependent coefficients derived from past samples s(n−T−K+1), . . . , s(n−T) [1], and where P denotes the order of the linear predictor.

Many other ways of predicting s(n) exist. For example, an estimate z(n) of s(n) could be computed using non-linear methods, such as deep neural networks (DNNs), i.e., $$z(n)=G(s(n-T-K+1),\ \ldots,\ s(n-T);\ \Theta,\ T), \tag{2}$$

where Θ denotes the set of parameters of the DNN and G(., Θ, T) represents the network. In this situation, the network G(., Θ, T) would be trained off-line, before deployment to predict signal samples separated by T samples, using a training set of clean speech signals, cf. e.g. chapter 5 in [2].

More generally, an estimate z(n) of s(n) could be computed using a DNN of the form, $$z(n)=G(s(n-T-K+1),\ \ldots,\ s(n-T),\ x(n);\ \Theta), \tag{3}$$

where x(n) represents a microphone signal captured at the hearing aid (i.e., a noisy version of what the network tries to predict). In this situation, we removed the network dependency on T, because it can be estimated internally in the DNN by comparing the wireless received samples s(n−T−K+1), . . . , s(n−T) with the local microphone signal x(n), for example by correlating the two sequences. This configuration which has access to an up-to-date, but potentially very noisy signal x(n) is particularly well-suited for prediction of transients/speech onsets, which may otherwise be challenging.

In yet another generalized version of the predictor, $$z(n)=G(s(n-T-K+1),\ \ldots,\ s(n-T),\ x_1(n),\ \ldots,\ x_M(n);\ \Theta), \tag{4}$$

the estimate z(n) is a function of the (out-dated, but potentially relatively noise-free) received wireless signal and multiple local microphone signals $x_1$ (n), . . . , $x_M$(n), (which are up-to-date, but potentially very noisy). This latter configuration has as a special case the situation, where z(n) is computed (partly) as a function of a beamformed signal y(n), computed at the hearing aid using the local microphone signals, $$y(n)=H(x_1(n),\ \ldots,\ x_M(n)), \tag{5}$$

where H(·) represents a beamforming operation. Yet other prediction methods exist.

Obviously, prediction is not limited to time domain signals s(n) as described above. For example, (linear) prediction could also take place in the time-frequency domain or in other domains (e.g. cosine, wavelet, Laplace, etc.).

In general, one can write the predicted signal as $$z(n)=s(n)+e(n), \tag{6}$$

where e(n) is the estimation error. If e(n) is considered as a noise term, the prediction process may be seen as simply 'trading' a delayed (outdated), essentially noise-free signal s(n−T) with an up-to-date, but generally noisy signal z(n)=s(n)+e(n). The more accurate prediction, the smaller the noise (prediction error). The signal-to-noise ratio (SNR) ξ(n) in the predicted signal may be estimated from the available past samples, for example as $$\hat{\xi}(n)=\sum_{n'=n-T-K+1}^{n-T} s^2(n') \Big/ \sum_{n'=n-T-K+1}^{n-T} e^2(n'), \tag{7}$$

where the sum is taken over available past samples. Alternatively, the SNR may be computed offline as a long-term average SNR to be expected for a particular value of T.

The SNR may also be estimated in the time-frequency domain (m,q), $$\hat{\xi}(m,\ q)=\sum_{m'=m-T'-K'+1}^{m-T'} |s(m',\ q)|^2 \Big/ \sum_{m'=m-T'-K'+1}^{m-T'} |e(m',\ q)|^2, \tag{8}$$

where s(m, q) and e(m, q) denote time-frequency representations (for example, short-time Fourier transforms) of signals s(n) and e(n), and T' and K' time-frequency analogues of T and K, where m is a time index (e.g. a time-frame index) and q is a frequency index (e.g. a frequency band index).

The predicted signal z(n) may be used in several ways in the hearing device.

For example, if the SNR ξ(n) is sufficiently high, one could simply substitute the noisy signal x(n) picked up at a microphone of the hearing device with the predicted signal z(n), for example in signal regions where the SNR ξ(n) in the predicted signal would be higher than the SNR in the microphone signal x(n) (as estimated by an SNR estimation algorithm on board the hearing device).

Alternatively, rather than substituting signal samples z(n), one could perform the substitution in frequency bands. For example, one could decompose and substitute z(n) in frequency channels (e.g. low frequencies), for which it is known that the predicted signal is generally of better quality than the hearing aid microphone signal. More generally, substitution could even be performed in the time-frequency domain according to an estimate of the SNR in time-frequency tiles, cf. eq. (8) above.

Alternatively, the signal z(n) may be combined with one or more of the microphone signals of the hearing device in various beamforming schemes in order to produce a final noise-reduced signal. In this situation, the signal z(n) is simply considered yet another microphone signal with a noisy realization of the target signal.

The description above assumed the predictor to be part of the receiver (i.e., the hearing system, e.g. a hearing device). However, it is also possible to do the prediction in the wireless microphone—assuming it has processing capabilities and can be informed of the time-difference-of-arrival T. In other words, the predicted signal z(n) is formed in the wireless microphone and transmitted to the hearing system (e.g. hearing device(s)), potentially together with side information such as the estimated SNR ξ(n).

The description above has assumed the wireless microphone is a single microphone that captures the essentially noise-free signal s(n). However, it could also consist of a microphone array (i.e., more than one microphone). In this case, a beamforming system could be implemented in the wireless device, and the output of the beamformer play the role of the essentially noise-free signal s(n). Further, the external (sound capturing) device may e.g. be constituted by or comprise a table microphone array capable of extracting at least one noise free signal.

Figure 2A:
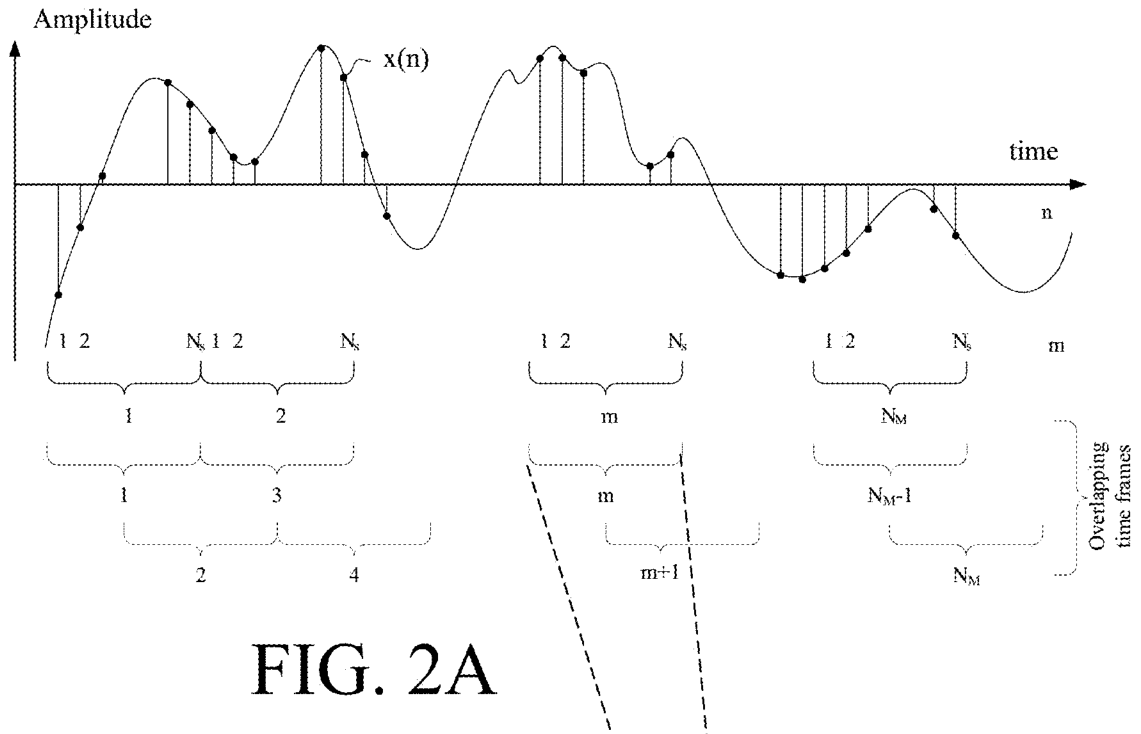

FIG. 2A schematically illustrates a time variant analogue signal (Amplitude vs time) and its digitization in samples x(n), the samples being arranged in time frames, each comprising a number $N_s$ of samples. FIG. 2A shows an analogue electric signal (solid graph), e.g. representing an acoustic input signal, e.g. from a microphone, which is converted to a digital audio signal x(n) in an analogue-to-digital (AD) conversion process, where the analogue signal is sampled with a predefined sampling rate $f_s$, $f_s$ being e.g. in the range from 8 kHz to 48 KHz (adapted to the particular needs of the application) to provide digital samples x(n) at discrete points in time n, as indicated by the vertical lines extending from the time axis with solid dots at their endpoint 'coinciding' with the graph, and representing its digital sample value at the corresponding distinct point in time n. Each (audio) sample x(n) represents the value of the acoustic signal at time n by a predefined number $N_b$ of (quantization) bits, $N_b$ being e.g. in the range from 1 to 48 bit, e.g. 24 bits. Each audio sample is hence quantized using No bits (resulting in $2^{Nb}$ different possible values of the audio sample).

In an analogue to digital (AD) process, a digital sample x(n) has a length in time of $1/f_s$, e.g. 50 μs, for $f_s$=20 kHz. A number of (audio) samples $N_s$ are e.g. arranged in a time frame, as schematically illustrated in the lower part of FIG. 2A, where the individual (here uniformly spaced) samples are grouped in time frames x(m) (comprising individual sample elements #1, 2, . . . , $N_s$)), where m is the frame number. As also illustrated in the lower part of FIG. 2A, the time frames may be arranged consecutively to be non-overlapping (time frames 1, 2, . . . , m, . . . , $N_M$), where m is a time frame index. Alternatively, the time frames may be overlapping (e.g. 50% or more, as illustrated in the lower part of FIG. 2A). In an embodiment, a time frame comprises 64 audio data samples. Other frame lengths may be used depending on the practical application. A time frame may e.g. have a duration of 3.2 ms (e.g. corresponding to 64 samples at a sampling rate of 20 kHz).

Figure 2B:
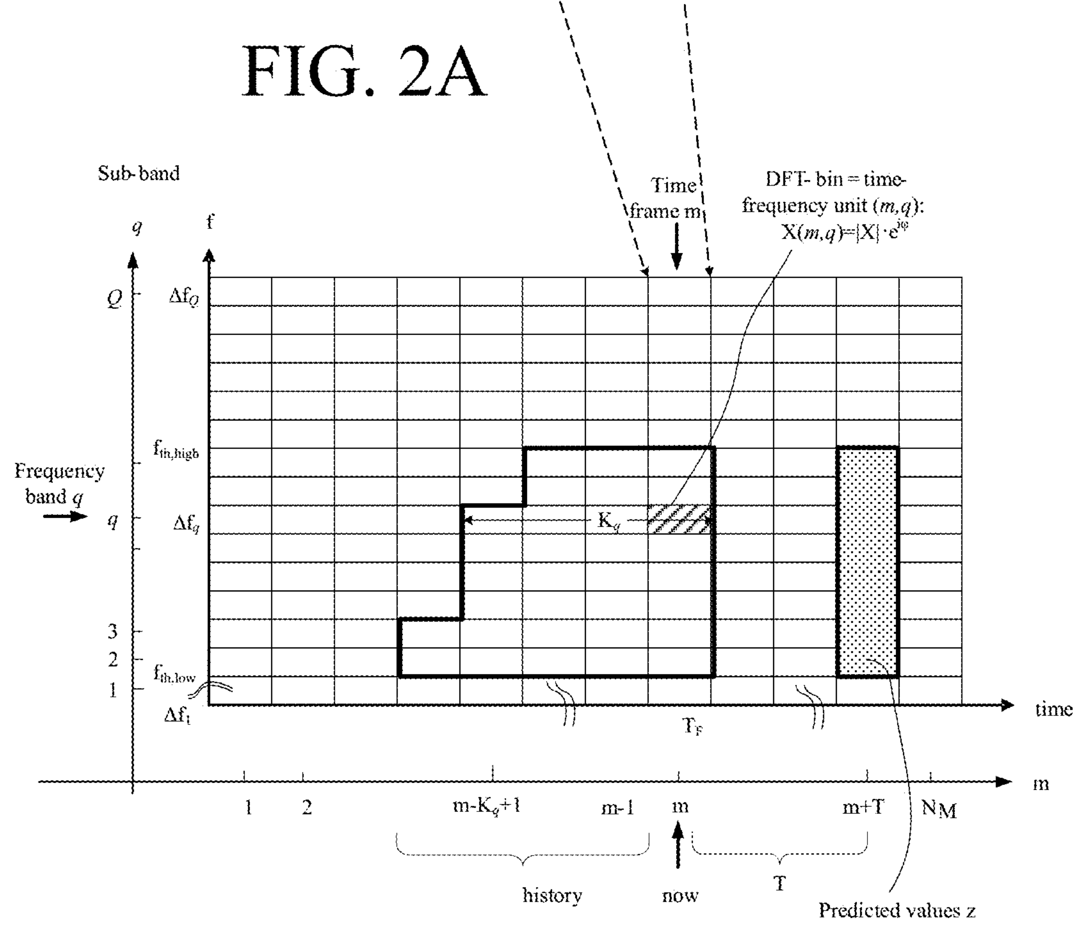

FIG. 2B schematically illustrates a time-frequency map (or frequency sub-band) representation of the time variant electric signal x(n) of FIG. 2A in relation to a prediction algorithm according to the present disclosure. The time-frequency representation $X_m(q)$ (q=1, . . . , Q, where q is a frequency index) comprises an array or map of corresponding complex or real values of the signal in a particular time and frequency range. The time-frequency representation may e.g. be a result of a Fourier transformation converting the time variant input signal x(n) to a (time variant) signal X(k,m) in the time-frequency domain. In an embodiment, the Fourier transformation comprises a discrete Fourier transform algorithm (DFT), e.g. a short time Fourier transformation (STFT) algorithm. The frequency range considered by a typical hearing device (e.g. a hearing aid) from a minimum frequency $f_{min}$ to a maximum frequency $f_{max}$ comprises a part of the typical human audible frequency range from 20 Hz to 20 kHz, e.g. a part of the range from 20 Hz to 12 kHz. In FIG. 7B, the time-frequency representation X(m,q) of signal x(n) comprises complex values of magnitude and/or phase of the signal in a number of DFT-bins (or tiles) defined by indices (m,q), where q=1, . . . , Q represents a number Q of frequency values (cf. vertical q-axis in FIG. 2B) and m=1, . . . , $N_M$ represents a number $N_M$ of time frames (cf. horizontal m-axis in FIG. 2B). A time frame is defined by a specific time index m, and the corresponding Q DFT-bins (cf. indication of Time frame m in FIG. 2B). A time frame m (or $X_m$) represents a frequency spectrum of signal x at time m. A DFT-bin or tile (m,q) comprising a (real) or complex value X(m,q) of the signal in question is illustrated in FIG. 2B by hatching of the corresponding field in the time-frequency map (cf. DFT-bin=time-frequency unit (m,q): $X(m,q)=|X|\cdot e^{i\varphi}$ in FIG. 2B, where |X| represents a magnitude and φ represents a phase of the signal in that time-frequency unit. Each value of the frequency index q corresponds to a frequency range $\Delta f_q$, as indicated in FIG. 2B by the vertical frequency axis f. Each value of the time index m represents a time frame. The time $T_F$ spanned by consecutive time indices depend on the length of a time frame and the degree of overlap between neighbouring time frames (cf. horizontal time-axis in FIG. 2B).

A time frame of an electric signal may e.g. comprise a number $N_s$ of consecutive samples, e.g. 64, (written as vector $x_m$) of the digitized electric signal representing sound, m being a time index, cf. e.g. FIG. 2A. A time frame of an electric signal may, however, alternatively be defined to comprise a magnitude spectrum (written as vector $X_m$) of the electric signal at a given point in time (as e.g. provided by a Fourier transformation algorithm, e.g. an STFT (Short Time Fourier Transform)-algorithm, cf. e.g. schematic illustration of a TF-map in FIG. 2B. The time frame $x_m$ representing a number of time samples, and the time frame $X_m$ representing a magnitude spectrum (of the same time samples) of the electric signal are tied together by Fourier transformation, as e.g. given by the expression $X_m=\overline{F}\cdot x_m$, where $\overline{F}$ is a matrix representing the Fourier transform.

The electric input signal(s) representing sound may be provided as a number of frequency sub-band signals. The frequency sub-bands signals may e.g. be provided by an analysis filter bank, e.g. based on a number of band-pass filters, or on a Fourier transform algorithm as indicated above (e.g. by consecutively extracting respective magnitude spectra from the Fourier transformed data).

As indicated in FIG. 2B, a prediction algorithm according to the present disclosure may be provided on a frequency sub-band level (instead of on the full-band (time-domain) signal as described above, cf. e.g. FIG. 1D). Thereby a down-sampling of the update rate of the respective (frequency sub-band) prediction algorithms is provided (e.g. a factor of 20 or more). The bold 'stair-like' polygon in FIG. 2B enclosing a number of historic time-frequency units (DFT-bins) of the (wirelessly received) input signal (from time 'now' (index m, cf. time 'n−T' in FIG. 1C, 1D) and $K_q$ time units backwards in time) indicate the part of the known input data that—for a given frequency band q—are used to predict future values z of the (wirelessly received) signal $s_{WLR}$ at a prediction time T later index m+T), cf. bold rectangle with dotted filling at time unit m+T. The prediction algorithm may be executed in all frequency bands q=1, . . . , Q, and e.g. may use the same number $K_q$ of historic values to predict the future value (or use different values for some frequency bands). But the prediction algorithm may be executed only in selected frequency bands, e.g. frequency bands having the most importance for speech intelligibility, e.g. frequency bands below a threshold frequency (cf. e.g. $f_{th}$ in FIG. 1C), or as indicated in the schematic illustration of FIG. 2B, above a low-frequency threshold frequency $f_{th,low}$ and below a high-frequency threshold frequency $f_{th,high}$. The high frequency threshold frequency $f_{th,high}$ may e.g. be 4 kHz (typically prediction is difficult at higher frequencies), or 3 kHz, or 2 kHz or smaller, e.g. 1 kHz. This is due in part to the origin of voice at frequencies above the high frequency threshold being mainly due to turbulent air streams in the mouth and throat region, which by nature is less predictable than voice at frequencies below the low-frequency threshold, which is mainly created by vibration of the vocal cords. The low-frequency threshold frequency $f_{th,low}$ may e.g. be larger than or equal to 100 Hz (typically human hearing perception is low below 100 Hz), or larger than or equal to 200 Hz or larger than or equal to 500 Hz. The parameter $K_q$ indicating the number of past values of time-frequency units that are used to predict a future time-frequency unit may be different, e.g. decreasing with increasing frequency (as illustrated in FIG. 2B), e.g. to mimic an increasing time period of a fundamental frequency with decreasing frequencies. Likewise, the weighting factor $a_i$ applied to each previous value (time frequency unit) of a given frequency sub-band signal may be frequency dependent $a_i=a_i(q)=a_{i,q}$. Even the prediction time T (e.g. due to different values of the parameter $K_q$) may be frequency dependent ($T=T(q)=T_q$). The individual prediction algorithms may be executed according to the present disclosure as discussed above for the full-band signal. Instead of operating on uniform frequency bands (the band width $\Delta f_q$ being independent of frequency index q) as shown in FIG. 2B, the prediction algorithms may operate on non-uniform frequency bands, e.g. having increasing width with increasing frequency (reflecting the logarithm nature of the human auditory system).

Figure 3:
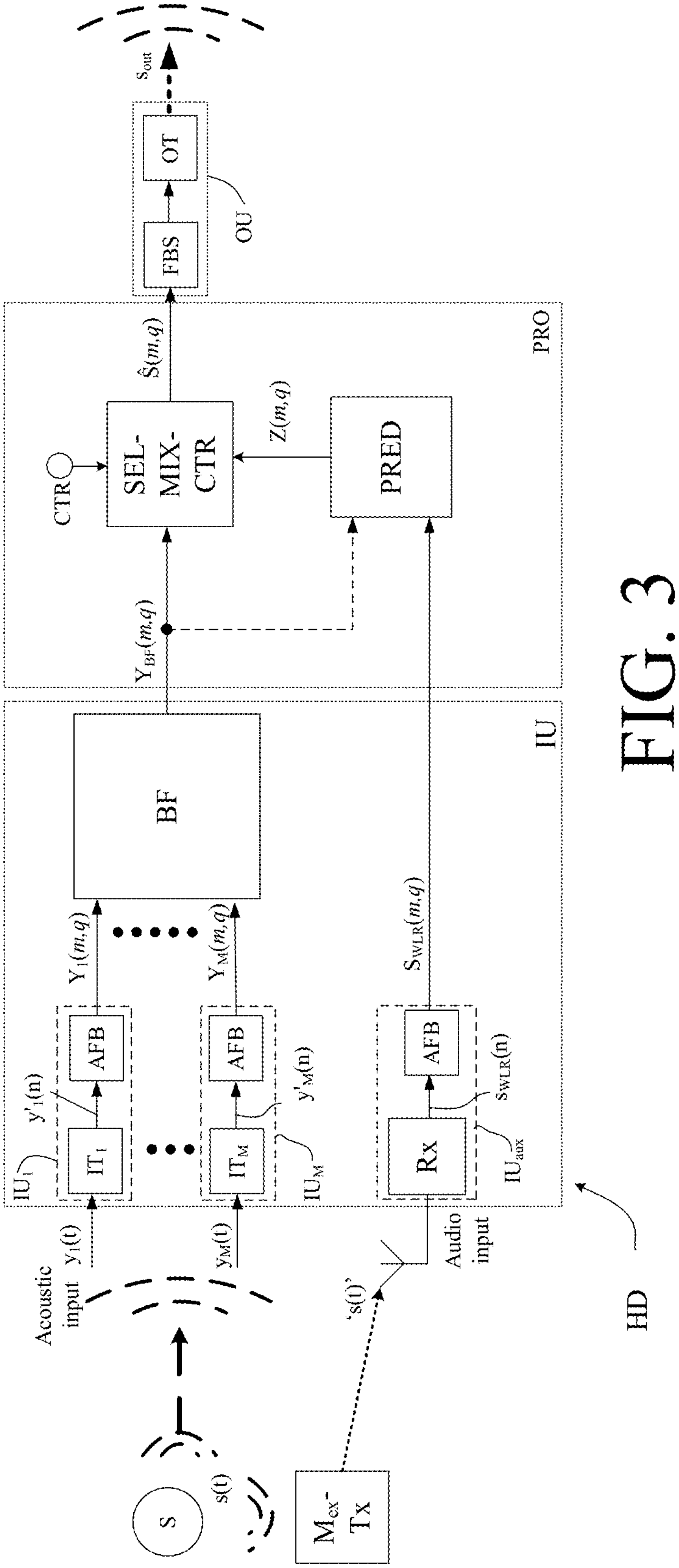
FIG. 3 shows an embodiment of a hearing system comprising a hearing device according to the present disclosure in communication with a sound capturing device.

FIG. 3 shows an embodiment of a hearing system comprising a hearing device (HD) according to the present disclosure in communication with a sound capturing device ($M_{ex}$–Tx). The hearing device (HD), e.g. a hearing aid, comprises an input unit (IU) comprising a multitude M (M≥2) of input units ($IU_1$, . . . , $IU_M$) comprising respective input transducers ($IT_1$, . . . , $IT_M$) (e.g. microphones) for converting sound ('Acoustic input', $y_1(t)$, . . . , $y_M(t)$) in the environment of the hearing device to a corresponding multitude of acoustically received electric input signals ($y'_1(n)$, . . . , $y'_M(n)$) representing said sound as a stream or streams of digital samples. The input units (e.g. the input transducers) may comprise appropriate analogue to digital converters, to provide the acoustically received electric input signals as digital samples. The input units ($IU_1$, . . . , $IU_M$) further comprise respective analysis filter banks (AFB) for providing the acoustically received electric input signals in a time-frequency representation (m,q) as signal $Y=(Y_1(m,q), \ldots, Y_M(m,q))$. The hearing device (HD) (here the input unit (IU)) further comprises an auxiliary input unit $IU_{aux}$ comprising a wireless receiver (Rx) for receiving an audio signal ('Audio input', s(t)) from a wireless transmitter (Tx) of a sound capturing device ($M_{ex}$) for picking up (a target) sound (S) in the environment and providing a wirelessly received electric input signal $s_{WLR}(n)$ representing said sound as a stream of digital samples ($s_{WLR}(n)$). The auxiliary input unit $IU_{aux}$ may comprise an appropriate analogue to digital converter, to provide the wirelessly received electric input signal as digital samples ($s_{WLR}(n)$). The input units ($IU_1$, . . . , $IU_M$) further comprise respective analysis filter banks (AFB) for providing the acoustically received electric input signal ($s_{WLR}(n)$) in a time-frequency representation (m,q) as signal $s_{WLR}(m,q)$. The hearing aid further comprises a beamformer (BF) configured to provide a beamformed signal $Y_{BF}(m,q)$ based on the multitude of acoustically received electric input signals ($Y_1(m,q)$, . . . , $Y_M(m,q)$). The hearing aid further comprises a processor (PRO) configured to receive beamformed signal $Y_{BF}(m,q)$ and the wirelessly received electric input signal $s_{WLR}(m,q)$. The processor (PRO) comprises a signal predictor (PRED) configured to estimate future samples (or time-frequency units) of the wirelessly received electric input signal $s_{WLR}(n)$ (or $s_{WLR}(m,q)$) in dependence of a multitude of past samples (or time-frequency units) of the signal, thereby providing a predicted signal z(n) (or Z(m,q)). The signal predictor (PRED) may be configured to run an estimation algorithm as outlined above (and in the prior art, cf. e.g. EP3681175A1). The signal predictor (PRED) may be configured to estimate a time difference of arrival between an acoustically received electric input signal (e.g. y'i(n), i=1, . . . , M, or the beamformed signal $Y_{BF}(m,q)$) and the wirelessly received electric input signal ($s_{WLR}(n')$, or $s_{WLR}(m,q)$), cf. e.g. delay estimator (DEST) in FIG. 4, e.g. by finding a time lag that optimizes a correlation function between the two signals. The time difference of arrival (cf. T in FIG. 4) may be fed to a prediction algorithm to determine the prediction time of the algorithm. The time difference of arrival (cf. T in FIG. 4) may be determined based on the time-frequency domain signals ($Y_{BF}(m,q)$ and $s_{WLR}(m,q)$), cf. dashed input $Y_{BF}(m,q)$ to the signal predictor (PRED). The hearing device further comprises a selection controller (SEL-MIX-CTR) configured to include the predicted signal based on the wirelessly received electric input signal in the (resulting) processed signal (S(m,q)) in dependence of a control signal, e.g. a sound quality measure, e.g. an SNR-estimate (cf. e.g. FIG. 4). The processed signal ($\hat{S}$(m,q)) may comprise or be constituted by the predicted signal (Z(m,q)). The processed signal ($\hat{S}$(m,q)) may be a mixture of the acoustically received, beamformed signal ($Y_{BF}$(m,q)) and, and the wirelessly received electric input signal (Z(m,q)), respectively. The embodiment of a hearing device of FIG. 3 further comprises an output unit (OU) comprising a synthesis filter bank (FBS) and an output transducer for presenting output stimuli perceivable as sound to the user in dependence of the processed signal from said processor ($\hat{S}$(m,q)), or a further processed version thereof (cf. e.g. FIG. 4). The output unit may comprise a digital to analogue converter as the case may be. The output transducer may comprise a loudspeaker of an air conduction type hearing device. The output transducer may comprise a vibrator of a bone conduction type hearing device. The output transducer may comprise a multi-electrode array or a cochlear implant type hearing device. In the latter case, the synthesis filter bank can be dispensed with.

Figure 4:
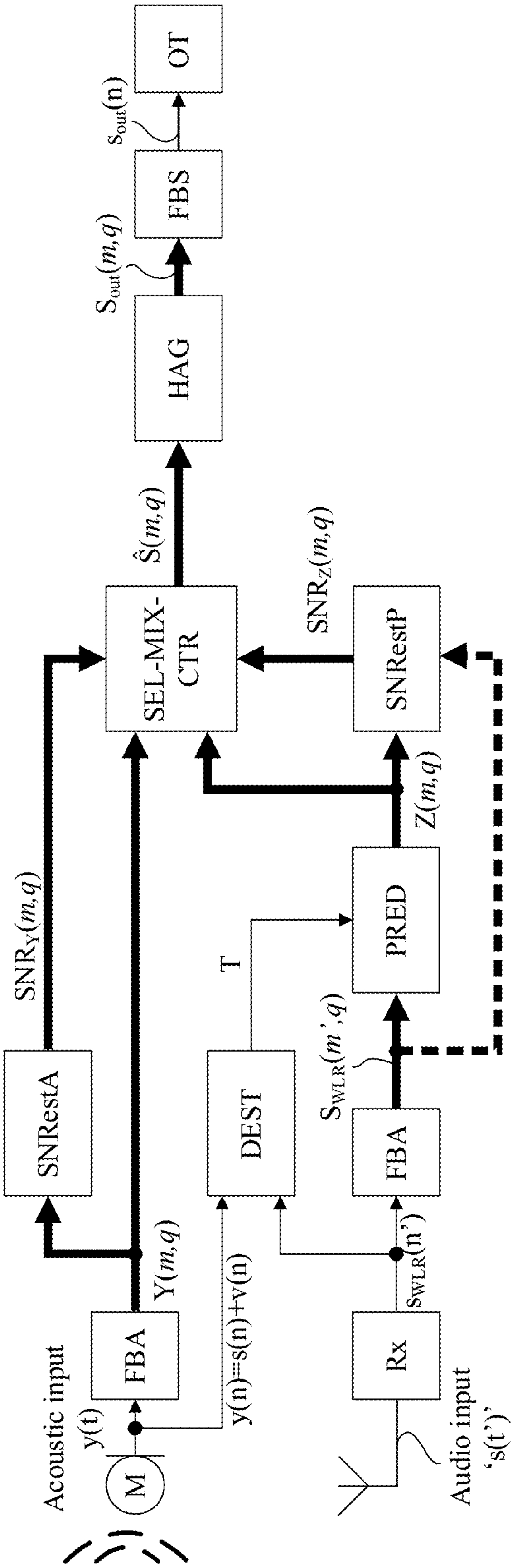
FIG. 4 shows an embodiment of a hearing aid comprising a signal predictor and respective signal quality estimators according to the present disclosure.

FIG. 4 shows an embodiment of a hearing aid according to the present disclosure. The hearing aid comprises an input transducer (here a microphone (M)) for converting sound ('Acoustic input y(t)', t representing time) in the environment of the hearing device to an acoustically received electric input signal (y(n)=s(n)+v(n)) representing said sound as a stream or streams of digital samples, n being a time index. The input transducer is assumed to provide the electric input signal as a stream of digital samples y(n), e.g. by using a MEMS microphone or by including an analogue to digital converter as appropriate. The Acoustic input y(t) (as the electric input signal v(n) based thereon) may comprise a target sound s and noise v from the environment (or from the user, or from the hearing aid (e.g. acoustic feedback)). The hearing aid further comprises a wireless receiver (Rx) for receiving an audio signal from a wireless transmitter of a sound capturing device for picking up sound in said environment. The wireless receiver (Rx) may e.g. comprise an antenna and corresponding electronic circuitry for receiving and extracting a payload (audio) signal and providing a wirelessly received electric input signal $s_{WLR}$(n') representing said sound as a stream of digital samples, n' being a time index. The hearing aid comprises respective analysis filter banks (or Fourier transform algorithms) for providing each of the digitized electric input signals y(n) and $s_{WLR}$(n') in a frequency sub-band or time-frequency representation Y(m, q) and $s_{WLR}$(m',q), respectively, where m and m' are time indices and q is a frequency index, respectively. The hearing aid further comprises a signal predictor (PRED) configured to estimate future samples (e.g. as values of time frequency units (m,q) in one or more frequency bands, q') of the wirelessly received electric input signal $s_{WLR}$(m,q) in dependence of a multitude of past samples of said signal $s_{WLR}$(m', q), thereby providing a predicted signal Z(m,q). The hearing aid further comprises a delay estimator (DEST) configured to estimate a time-difference-of-arrival (T) of sound from a given sound source in the environment at the hearing aid (e.g. at the inputs of the delay estimator) between the acoustically received electric input signal y(n) and the wirelessly received electric input signal $s_{WLR}$(n'). The time-difference-of-arrival (T) provides as an output of the delay estimator is fed to the signal predictor (PRED) to define a prediction time period of the signal predictor. The transmit time-difference-of-arrival (T) may e.g. be determined by correlating the acoustically received signal with the wirelessly received signal. The hearing aid further comprises respective SNR estimators (SNRestA, SNRestP) configured to provide an estimate of the signal to noise ratio of the acoustically received electric input signal (Y(m,q)) and the predicted signal (Z(m,q)), respectively. SNR-estimation may in general be provided in a number of ways, e.g. involving a voice activity detector, and e.g. estimating a noise level <N($m_0$,q)> during speech pauses and providing a noise estimate as Y(m,q)/<N($m_0$,q)>, where $m_0$ is the last time index where noise was estimated (last speech pause). More sophisticated SNR estimation schemes, or other signal quality estimates, are available, see e.g. US20190378531A1. The SNR estimators (SNRestA, SNRestP) applied to the acoustically received and the predicted signals, respectively, may be based on different principles. The SNR estimator (SNRestP) of the predicted signal (Z) may be estimated based on the previous values of the wirelessly received electric input signal ($s_{WLR}$) (cf. dashed input to the SNR estimator (SNRestP)) and a prediction error signal e (Z=S+e), cf. outline above in connection with eq. (7) and (8) (for respective time domain and time-frequency domain implementations). The hearing aid further comprises a selection controller (SEL-MIX-CTR) configured to include said estimated future samples of said wirelessly received electric input signal in said processed signal in dependence of a sound quality measure, her in dependence of the SNR-estimates $SNR_Y$(m,q) and $SNR_Z$(m,q) of the acoustically received and wirelessly received electric input signals Y(m, q) and Z(m,q), respectively. The estimated future samples of said wirelessly received electric input signal may be included in time regions where the predicted signal fulfils a sound quality criterion (e.g. in that the sound quality measure, here that the SNR-estimate $SNR_Z$(m,q) is larger than a first threshold value $SNR_{TH1}$(q), or larger than the SNR estimate of the acoustically received signal Y(m,q)). For example, if the SNR estimate is sufficiently high, e.g. larger than a second threshold value $SNR_{TH2}$(q), selection controller may be configured to substitute the (noisy) acoustically received electric input signal y(n) (or picked up at a microphone of the hearing aid with the predicted signal z(n), for example in time regions where the estimated SNR in the predicted signal is higher than the estimated SNR in the microphone signal y(n) (as estimated by an SNR estimation algorithm on board the hearing aid), n being a time (sample) index. In the time-frequency-domain, such scheme may equivalently be adapted on a frequency sub-band level (q) or even on a time-frequency unit level (i.e. individually for each TF-unit (m,q)). The selection controller (SEL-MIX-CTR) thus receives as audio inputs signals Y(m,q) and Z(m,q) and provides as an output an (enhanced) audio signal $\hat{S}$(m,q) in dependence of control signals $SNR_Y$(m,q) and $SNR_Z$(m,q). The hearing aid further comprises a signal processing unit (HAG) configured to provide a frequency dependent gain and/or a level dependent compression, e.g. to compensate for a hearing impairment of a user. The thus determined hearing aid gain may be applied to the (enhanced) audio signal $\hat{S}$(m,q) and provides (user adapted) processed signal $S_{out}$(m,q). The hearing aid further comprises a synthesis filter bank (FBS) for converting a signal in the time-frequency domain ($S_{out}$(m,q)) to a signal in the time domain $s_{out}$(n). The hearing aid further comprises an output transducer (OT) for presenting output stimuli perceivable as sound to the user in dependence of the processed signal $s_{out}$(n) from the processor, or a further processed version thereof. The output transducer may e.g. comprise a loudspeaker, or a vibrator, or an implanted electrode array. Some of the functional components of the hearing aid of FIG. 4 may be included in a (e.g. digital signal) processor. The processor is configured to receive a) the at least one acoustically received electric input signal or signals, or a processed version thereof, b) the wirelessly received electric input signal, and to provide a processed signal in dependence thereof. The (digital signal) processor may comprise the following functional blocks of the embodiment of FIG. 4: a) the analysis filter banks (FBA), b) the delay estimator (DEST), c) the signal predictor (PRED), d) the SNR estimators (SNRest), c) the selection controller (SEL-MIX-CTR), f) the signal processing unit (HAG), and g) the synthesis filter bank (FBS). Other functional blocks, e.g. related to feedback control, or further analysis and control blocks, e.g. related to own voice estimation/voice control, etc., may as well be included in the (digital signal) processor.

Figure 5:
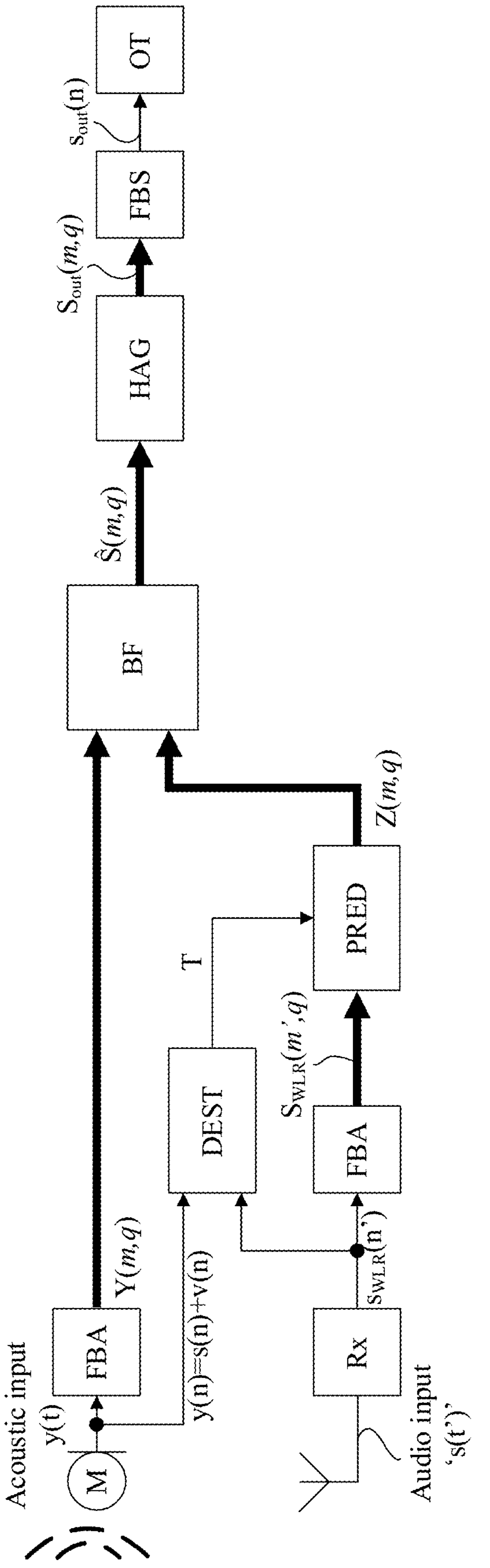
FIG. 5 shows an embodiment of a hearing aid comprising a signal predictor and a beamformer according to the present disclosure.

FIG. 5 shows an embodiment of a hearing aid comprising a signal predictor and a beamformer according to the present disclosure. The embodiment of FIG. 5 is similar to the embodiment of FIG. 4, except that no SNR estimator (SNRestP, SNRestP) to control the mixture of the acoustically received electric input signal (Y) and the predicted signal (Z) are indicated. Further, instead of the selection controller (SEL-MIX-CTR) of FIG. 4, a beamformer filter (BF) is included in the embodiment of FIG. 5. Or in other words, the selection controller (SEL-MIX-CTR) may be embodied in the beamformer filter (BF) providing the (enhanced) audio signal $\hat{S}(m,q)$. In this embodiment, the predicted signal (z(n) or Z(m,q)) is combined with one or more of the microphone signals of the hearing aid in various beamforming schemes in order to produce a final noise-reduced signal (here only one microphone signal, Y(m,q), is shown, but there may in other embodiments be a multitude M of electric input signals, cf. e.g. FIG. 3). In this situation, the predicted signal is simply considered yet another microphone signal with a noisy realization of the target signal.

Figure 6A:
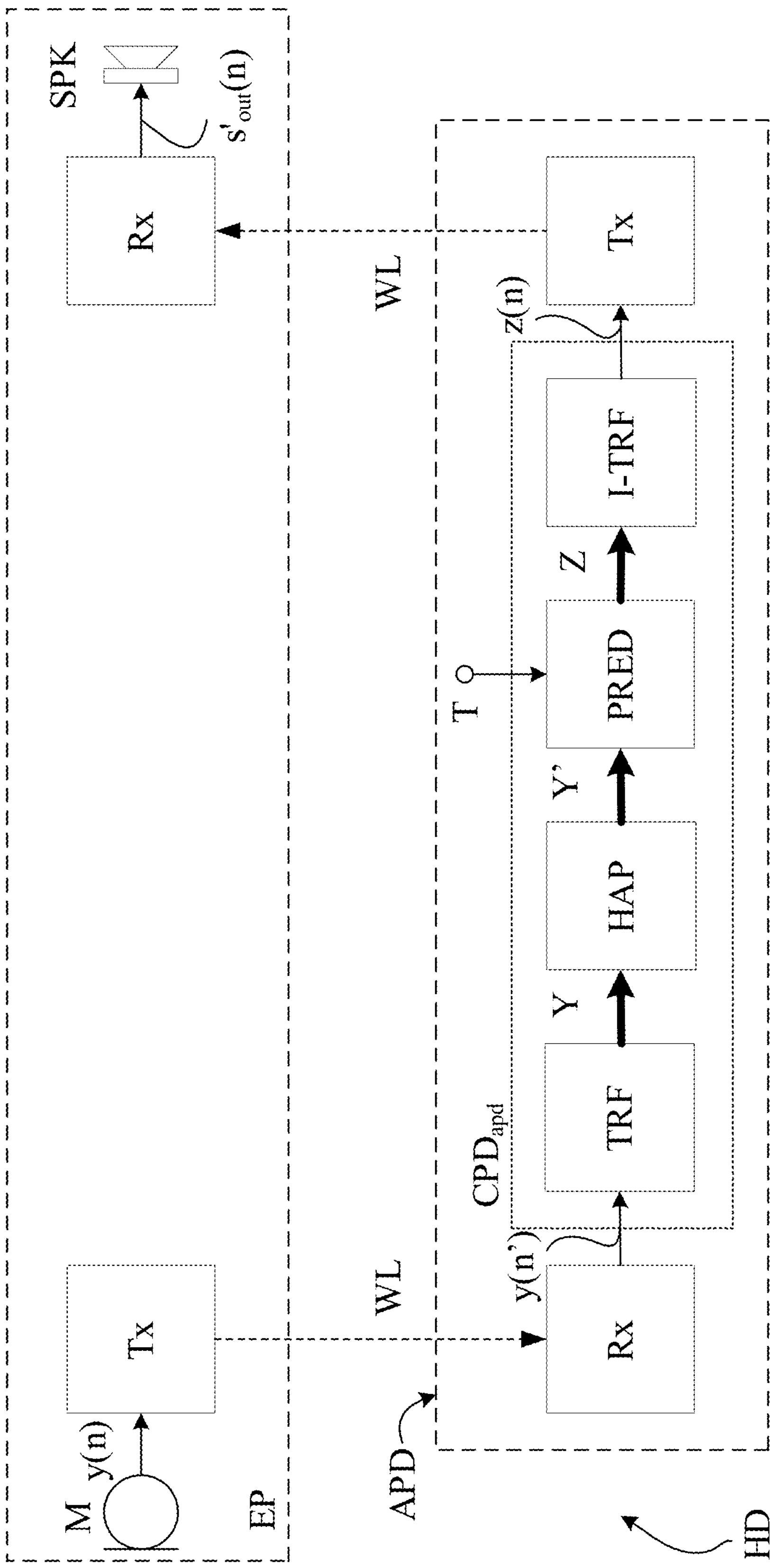
FIG. 6A shows an embodiment of a hearing aid comprising an earpiece and a (e.g. body-worn) processing device in communication with each other comprising, wherein the body-worn processing device comprises a signal predictor according to the present disclosure.

FIG. 6A shows an embodiment of a hearing device (HD) comprising an earpiece (EP) and a body-worn audio processing device (APD) in communication with each other. The (possibly) body-worn processing device (APD) comprises a computing device ($CPD_{apd}$, e.g. an audio signal processor or similar) comprising a signal predictor (PRED) according to the present disclosure. The hearing device, e.g. a hearing aid, comprises at least one earpiece (EP) configured to be worn at or in an ear of a user and a separate audio processing device (APD) configured to be worn or carried by the user (or at least located sufficiently close to the user to stay in communication with the earpiece via the wireless link implemented by the transceivers of the respective devices).

The at least one earpiece (EP) comprises an input transducer (here a microphone (M) for converting sound in the environment of the hearing device to an acoustically received electric input signal y(n) representing the sound. The earpiece further comprises a wireless transmitter (Tx) for transmitting the acoustically received electric input signal y(n), or a part (e.g. a filtered part, e.g. a lowpass filtered part) thereof, to the audio processing device (APD). The earpiece (EP) further comprises a wireless receiver for receiving a predicted signal from said audio processing device, at least in a normal mode of operation of the hearing device. The wireless transmitter and receiver may be provided as antenna and transceiver circuitry for establishing an audio communication link (WL) according to a standardized of proprietary (short range) protocol. The earpiece (EP) further comprises an output transducer (here a loudspeaker (SPK)) for converting a (final) processed signal $s'_{out}(n)$ to stimuli perceived by the user as sound. The processed signal ($s'_{out}(n)$) may, at least in a normal mode of operation of the hearing device, be constituted by or comprise at least a part of the predicted signal (provided by the audio processing device, (or by the earpiece as in FIG. 6B), see in the following).

The audio processing device (APD) comprises a wireless receiver (Rx) for receiving the acoustically received electric input signal y(n), or a part thereof, from the earpiece (EP), and is configured to provide a received signal y(n') representative thereof. The audio processing device (APD) (e.g. the computing device ($CPD_{apd}$)) further comprises a processor part (HAP) for applying a processing algorithm (e.g. including a neural network) to said received signal (y(n')), or to a signal originating therefrom, e.g. a transformed version thereof (Y), and to provide a modified signal (Y'). The processor part (HAP) may e.g. be configured to compensate for a hearing impairment of the user (e.g. by applying a compressive amplification algorithm, e.g. providing a frequency and/or level dependent gain (or attenuation) to be applied to the input signal (y(n'), or Y). The audio processing device (APD) (e.g. the computing device ($CPD_{apd}$)) further comprises a signal predictor (PRED) for estimating future values of the modified signal (y', Y') in dependence of a multitude of past values of the signal, thereby providing a predicted signal (z, Z). The signal predictor (PRED) may comprise a prediction algorithm (either working in the time domain or in a transform domain, e.g. the time-frequency domain) configured to predict future values of an input signal based on past values of the input signal, and knowledge of a prediction time, e.g. a processing delay (cf. input T) between the first future value(s) and the latest past value(s) of the input signal (cf. e.g. FIG. 1C, 1D). The total processing delay (T) may be a sum of delays ($T_{link}$) incurred by the wireless link between the earpiece (EP) and the separate processing device (APD) plus the processing delay ($T_{apd}$) in the audio processing device (i.e. $T=T_{link}+T_{apd}$). The processing delay ($T_{link}$) of the wireless link is dependent of the technology (communication protocol) used for establishing the link and may be known or estimated in advance (or during use). The processing delay ($T_{apd}$) of the audio processing device is dependent of the processing blocks of the audio path through the device from the receiver to the transmitter and may likewise be known or estimated in advance (or during use). The audio processing device (APD) further comprises a transmitter (Tx) for transmitting said predicted signal (Z) or a processed version thereof ($s_{out}(n)$) (termed the 'first processed signal') to the earpiece (EP).

The signal predictor (PRED) is configured to fully or partially compensate for a processing delay incurred by a) the transmission of the acoustically received electric input signal (y(n)) from the earpiece (EP) to the audio processing device (APD), b) the processing in the audio processing device (APD) (through its audio signal processing path from receiver (Rx) to transmitter (Tx)), and c) the transmission of the predicted signal (z(n) or a processed version thereof to said earpiece (EP) and its reception therein (as signal $s'_{out}(n)$). This is achieved by providing an estimate T of the total processing delay ($T=T_{link}+T_{apd}$) as input to the prediction algorithm (PRED).

In the embodiment of FIG. 6A, the audio processing device (APD) (e.g. the computing device ($CPD_{apd}$)) further comprises respective transform domain and inverse transform domain units (TRF, I-TRF) to convert a signal in the time domain (here the received signal (y(n') from the earpiece) to a transform domain (e.g. the time-frequency domain), cf. signal Y, and back again (here the predicted signal Z in the transform domain to z(n) in the time domain). In the embodiment of FIG. 6A, the signal predictor (PRED) is implemented in the transform domain. In the embodiment of FIG. 6C, the signal predictor (PRED) is implemented in the time domain. This can be chosen as a design feature according to the specific configuration (e.g. partition) of the device/system.

Figure 6B:
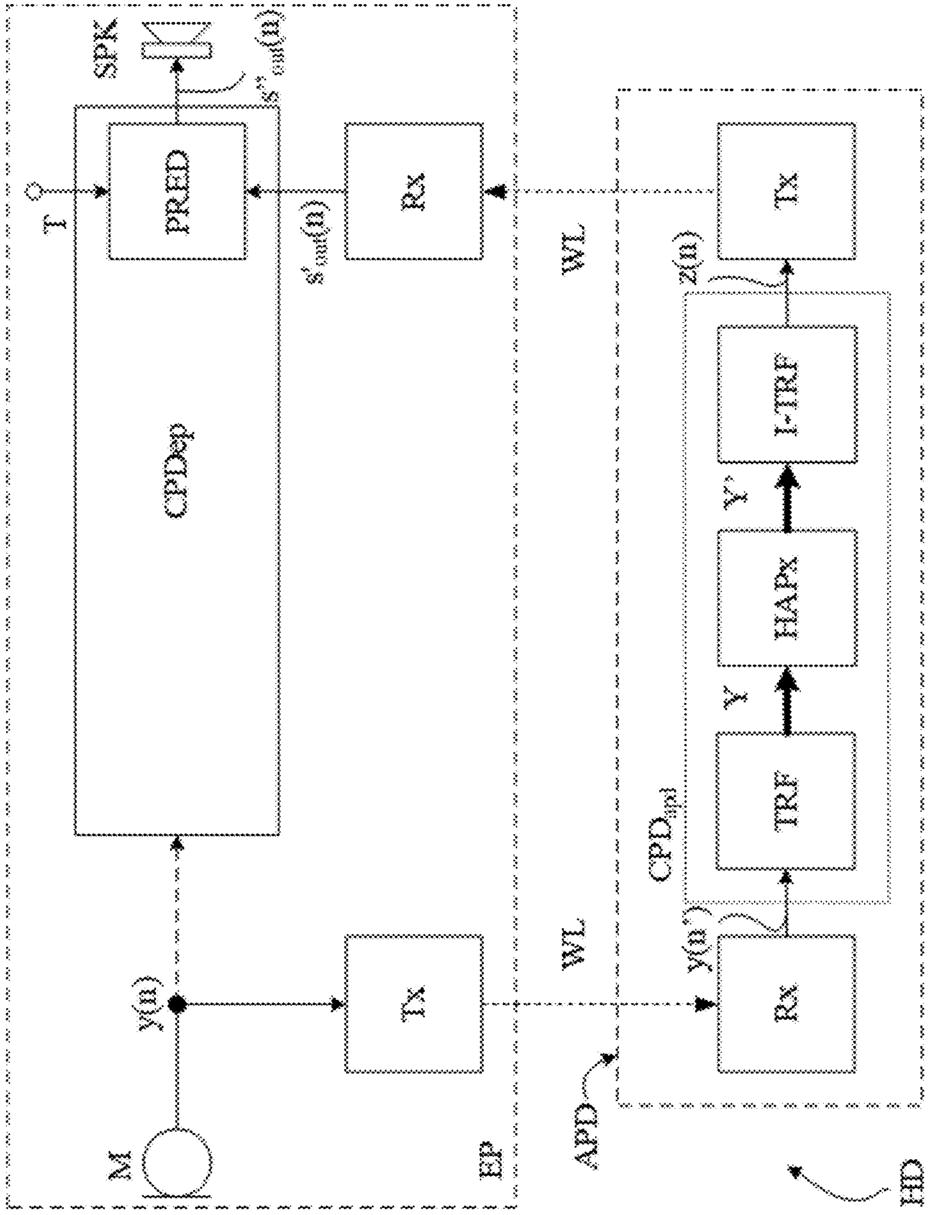
FIG. 6B shows an embodiment of a hearing aid comprising an earpiece and a (e.g. body-worn) processing device as shown in FIG. 6A, but where the earpiece further comprises a processing unit allowing a signal from the microphone/and or from the audio processing device to be processed, e.g. to provide the predicted signal in the earpiece.
Figure 6C:
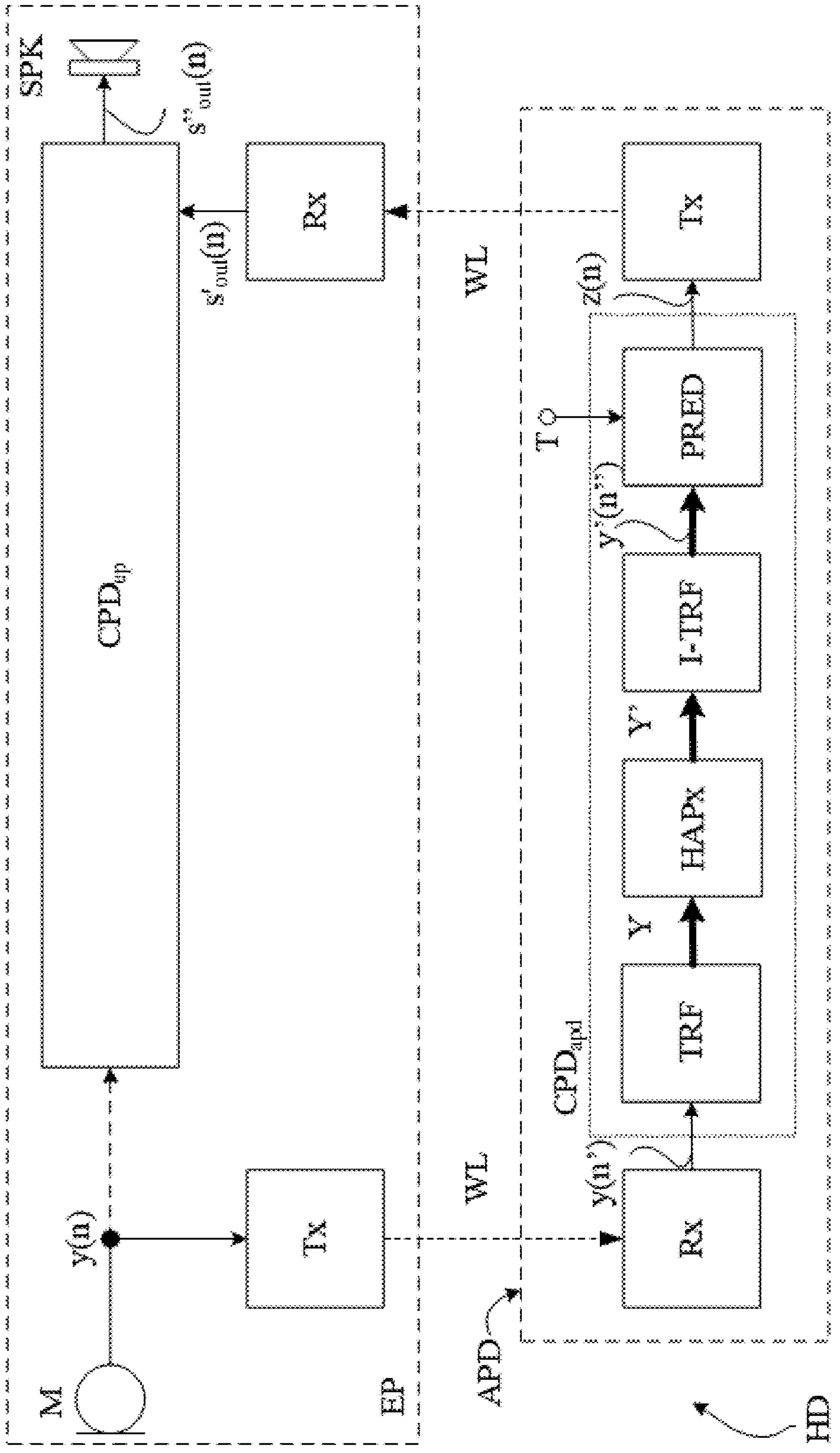
FIG. 6C shows an embodiment of a hearing aid comprising an earpiece and a (e.g. body-worn) processing device as shown in FIG. 6A, where the earpiece further comprises a processing unit allowing a signal from the microphone/and or from the audio processing device to be processed, and where the signal predictor is located in the audio processing device (as in FIG. 6A), but works in the time domain.

FIG. 6B shows an embodiment of a hearing aid (HD) comprising an earpiece (EP) and a (e.g. body-worn) processing device (APD) as shown in FIG. 6A, but where the earpiece further comprises a computing device ($CPD_{ep}$) (e.g. a signal processing unit) allowing a signal from the microphone (M) (signal y(n)) and/or from the wireless receiver (Rx) (signal $s'_{out}(n)$) to be processed in the earpiece. The computing device ($CPD_{ep}$) provides a final processed signal ($s''_{out}(n)$ in FIG. 6B) that is fed to the output transducer (here loudspeaker (SPK)) for presentation to the user. In the embodiment of FIG. 6B, the signal predictor (PRED) is implemented in the time domain.

FIG. 6C shows an embodiment of a hearing aid comprising an earpiece and a body-worn processing device as shown in FIG. 6A, but where the signal predictor works in the time domain (in that the order of the inverse transform domain unit (I-TRF) and the signal predictor (PRED) has been reversed). A further difference is that the earpiece (EP) comprises a computing device ($CPD_{ep}$) allowing the earpiece to process the acoustically received signal (y(n)) and or the first processed signal received from the separate audio processing device (APD). The optional processing of the acoustically received signal (y(n)) (as indicated by dashed input to the computing device ($CPD_{ep}$)) may e.g. be of interest in a mode of operation, where no contact to the audio processing device (APD) can be established (e.g. to provide the user with basic functions of the hearing device (e.g. hearing loss compensation).

Regarding the embodiments of FIG. 6A, 6B, 6C, is should be mentioned that the signals transmitted from the earpiece (EP) to the (external) audio processing device (APD), via the wireless link (WL), and/or from the audio processing device (APD) to the earpiece (EP), do not necessarily have to be 'audio signal(s)' as such. It may as well be features derived from the audio signal(s). E.g. instead of transmitting an audio signal back to the hearing device, a gain derived from the predicted signal could be transmitted back.

The term 'or a processed version thereof' may e.g. cover such extracted features from an original audio signal. The term 'or a processed version thereof' may e.g. also cover an original audio signal that has been subject to a processing algorithm that applies gain or attenuation to the original audio signal and this results in a modified audio signal (preferably enhanced in some sense, e.g. noise reduced relative to a target signal).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[1] Deller, Hansen and Proakis, "Discrete-Time Processing of Speech Signals," IEEE Press, 2000.

[2] Goodfellow, Bengio and Courville, "Deep Learning," MIT Press, 2016.

EP3681175A1 (Oticon) 15.07.2020

US20190378531A1 (Oticon) 12.12.2019

The invention claimed is:

1. A hearing device comprising at least one input transducer for converting sound in the environment of the hearing device to respective at least one acoustically received electric input signal or signals representing said sound;

a wireless receiver for receiving an audio signal from a wireless transmitter of a sound capturing device for picking up sound in said environment and providing a wirelessly received electric input signal representing said sound;

a processor configured to receive said at least one acoustically received electric input signal or signals, or a processed version thereof;

to receive said wirelessly received electric input signal; and to provide a processed signal, the processor being configured for estimating future values of said wirelessly received electric input signal in dependence of a multitude of past values of said signal, thereby providing an estimated signal;

an output transducer for presenting output stimuli perceivable as sound to the user in dependence of said processed signal from said processor, or a further processed version thereof, wherein the processor is configured to provide said processed signal in dependence of the estimated signal or a processed version thereof alone, or mixed with said at least one acoustically received electric input signal or signals, or a processed version thereof.

2. A hearing device according to claim 1 wherein the processor comprises a delay estimator configured to estimate a time-difference-of-arrival of sound from a given sound source in said environment at said processor between said acoustically received electric input signal or signals, or a processed version thereof, and said wirelessly received electric input signal.

3. A hearing device according to claim 1 comprising a wireless transmitter for transmitting data to another device.

4. A hearing device according to claim 1 wherein the processor comprises a selection controller configured to include said estimated signal or parts thereof in said processed signal in dependence of a sound quality measure.

5. A hearing device according to claim 1 comprising a transform unit, or respective transform units, for providing said at least one acoustically received electric input signal or signals, or a processed version thereof, and/or said wirelessly received electric input signal in a transform domain.

6. A hearing device according to claim 5 wherein said transform units are configured to provide said signals in the frequency domain.

7. A hearing device according to claim 6 wherein the processor is configured to include said estimated future values of said wirelessly received electric input signal in the processed signal only in a limited part of an operating frequency range of the hearing device.

8. A hearing device according to claim 7 wherein the processed signal comprises future values of said wirelessly received electric input signal only in frequency bands or time-frequency regions that fulfil a sound quality criterion.

9. A hearing device according to claim 1 comprising a beamformer configured to provide a beamformed signal based on said at least one acoustically received electric input signal or signals and said estimated signal.

10. A hearing device according to claim 1 configured to apply spatial cues to the estimated signal before being presented to the user.

11. A hearing device according to claim 2 configured to only activate estimating future values in case the time-difference-of-arrival is larger than a minimum value.

12. A hearing device according to claim 1 comprising a hearing instrument, a headset, an earphone, an ear protection device or a combination thereof.

13. A hearing device comprising at least one earpiece configured to be worn at or in an ear of a user; and a separate audio processing device;

the at least one earpiece comprising an input transducer for converting sound in the environment of the hearing device to an acoustically received electric input signal representing said sound;

a wireless transmitter for transmitting said acoustically received electric input signal, or a part thereof, to said audio processing device;

a wireless receiver for receiving a first processed signal from said audio processing device, at least in a normal mode of operation of the hearing device; and an output transducer for converting a final processed signal to stimuli perceived by said user as sound, the audio processing device comprising a wireless receiver for receiving said acoustically received electric input signal, or a part thereof, from the earpiece, and to provide a received signal representative thereof;

a computing device for processing said received signal, or a signal originating therefrom, and to provide a first processed signal;

a transmitter for transmitting said first processed signal to said earpiece;

wherein said earpiece or said audio processing device is configured for estimating future values of said received signal, or a processed version thereof, in dependence of a multitude of past values of said signal, thereby providing an estimated signal;

wherein said estimating is configured to fully or partially compensate for a processing delay incurred by one or more, such as all of said transmission of the acoustically received electric input signal from the hearing device to the audio processing device, said processing in the audio processing device, and said transmission of the estimated signal or a processed version thereof to said earpiece and its reception therein;

wherein the final processed signal, at least in a normal mode of operation of the hearing device, is constituted by or comprises at least a part of said estimated signal.

14. A hearing device according to claim 13 wherein the audio processing device is configured to perform said estimating.

15. A hearing device according to claim 13 wherein the earpiece comprises an earpiece-computing device configured process said acoustically received electric input signal and/or to said first processed signal received from the audio processing device, and to provide said final processed signal, and wherein the earpiece computing device, at least in a normal mode of operation of the hearing device, is configured to mix the acoustically received electric input signal, or the modified signal, with an estimated signal received from the audio processing device and to provide the mixture as the final processed signal to the output transducer.

16. A hearing device according to claim 13 comprising a hearing instrument, a headset, an earphone, an ear protection device or a combination thereof.

17. A hearing device according claim 15 wherein the earpiece computing device, in an earpiece-mode of operation, where said first processed signal is not received from the audio processing device, or is received in an inferior quality, is configured to provide the final processed signal to the output transducer in dependence of the acoustically received input signal.

18. A hearing device or system comprising at least one earpiece configured to be worn at or in an ear of a user and to receive an acoustic signal and to present a final processed signal to the user; and a separate audio processing device in communication with the at least one earpiece;

wherein the earpiece is configured to transmit said acoustic signal to the audio processing device; and wherein the audio processing device is configured for estimating future values of the acoustical signal received by the at least one earpiece, or a processed version thereof, in dependence of a multitude of past values of said signal, thereby providing an estimated signal; and wherein the audio processing device is configured to compensate for or reduce the delay incurred by the processing being conducted in the external processing device.

19. A hearing device or system according to claim 18 wherein the audio processing device is configured to transmit the estimated signal or a processed version thereof to said earpiece; and wherein the earpiece is configured to determine said final processed signal in dependence of said estimated signal.

20. A hearing device or system according to claim 18 wherein the audio processing device is configured to fully or partially compensate for a processing delay incurred by one or more, such as all of a) a transmission of the acoustically received electric input signal from the hearing device to the audio processing device, b) a processing in the audio processing device providing an estimated signal, and c) a transmission of the estimated signal or a processed version thereof to said earpiece and its reception therein.

* * * * *